US007716163B2

(12) United States Patent
Reynar et al.

(10) Patent No.: US 7,716,163 B2
(45) Date of Patent: May 11, 2010

(54) METHOD AND SYSTEM FOR DEFINING SEMANTIC CATEGORIES AND ACTIONS

(75) Inventors: Jeff Reynar, Woodinville, WA (US); Lee C. Hunt, Seattle, WA (US); Michael Ammerlaan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 09/907,418

(22) Filed: Jul. 17, 2001

(65) Prior Publication Data

US 2002/0029304 A1    Mar. 7, 2002

Related U.S. Application Data

(63) Continuation-in-part of application No. 09/588,411, filed on Jun. 6, 2000.

(51) Int. Cl.
*G06F 17/30* (2006.01)
(52) U.S. Cl. ............................................. 707/10; 707/1
(58) Field of Classification Search ................. 707/200, 707/203, 1, 6, 10; 715/513, 515; 382/225
See application file for complete search history.

(56) References Cited

U.S. PATENT DOCUMENTS

| 4,674,065 | A | | 6/1987 | Lange et al. ................. 364/900 |
| 4,868,750 | A | | 9/1989 | Kucera et al. .................... 711/2 |
| 5,020,019 | A | * | 5/1991 | Ogawa ........................... 707/5 |
| 5,082,253 | A | | 1/1992 | Suzuki et al. .................. 395/51 |
| 5,128,865 | A | | 7/1992 | Sadler ............................ 704/2 |
| 5,159,552 | A | | 10/1992 | van Gasteren et al. ......... 704/1 |
| 5,267,155 | A | | 11/1993 | Buchanan et al. ...... 364/419.14 |
| 5,287,448 | A | | 2/1994 | Nicol et al. .................. 715/707 |

(Continued)

FOREIGN PATENT DOCUMENTS

CA    2 246 920 A1    3/2000

(Continued)

OTHER PUBLICATIONS

U.S. Appl. No. 10/426,446, filed Apr. 29, 2003, Feinberg et al.

(Continued)

*Primary Examiner*—Don Wong
*Assistant Examiner*—Sheree N Brown
(74) *Attorney, Agent, or Firm*—Merchant & Gould

(57) ABSTRACT

An XML (eXtensible Markup Language) schema to define a list of terms to be recognized as semantic categories is disclosed. Using an instance of the XML schema, a user may easily define terms to be recognized as semantic categories without having to compile a complete recognizer plug-in. The XML schema may be written using any editing tool or XML schema editing tool to create an instance of the schema. An instance of the semantic category list schema is also referred to as a semantic category list file. Typically, the user completes all of the properties of the XML schema and specifies the list of terms to recognize directly in the XML schema. In addition to specifying terms directly in the XML schema, the user may use a binary representation of the list of terms because of size constraints. The user may also define actions in the semantic category list file.

17 Claims, 8 Drawing Sheets

U.S. PATENT DOCUMENTS

| | | | |
|---|---|---|---|
| 5,297,039 A | 3/1994 | Kanaegami et al. | 707/5 |
| 5,317,546 A | 5/1994 | Balch et al. | 368/9 |
| 5,337,233 A | 8/1994 | Hofert et al. | 715/540 |
| 5,341,293 A | 8/1994 | Vertelney et al. | 715/530 |
| 5,351,190 A | 9/1994 | Kondo | 704/8 |
| 5,386,564 A | 1/1995 | Shearer et al. | 395/650 |
| 5,392,386 A | 2/1995 | Chalas | 395/155 |
| 5,418,902 A | 5/1995 | West et al. | 715/503 |
| 5,446,891 A | 8/1995 | Kaplan et al. | 395/600 |
| 5,522,089 A | 5/1996 | Kikinis et al. | 710/73 |
| 5,535,323 A | 7/1996 | Miller et al. | 715/707 |
| 5,541,836 A | 7/1996 | Church et al. | 704/7 |
| 5,546,521 A | 8/1996 | Martinez | 715/711 |
| 5,581,684 A | 12/1996 | Dudzik et al. | 715/708 |
| 5,596,700 A | 1/1997 | Darnell et al. | 715/512 |
| 5,617,565 A | 4/1997 | Augenbraun et al. | 395/604 |
| 5,625,783 A | 4/1997 | Ezekiel et al. | 395/352 |
| 5,627,567 A | 5/1997 | Davidson | 345/173 |
| 5,627,958 A | 5/1997 | Potts et al. | 715/708 |
| 5,634,019 A | 5/1997 | Koppolu et al. | 715/744 |
| 5,640,560 A | 6/1997 | Smith | 395/615 |
| 5,657,259 A | 8/1997 | Davis et al. | 708/204 |
| 5,685,000 A | 11/1997 | Cox | 704/9 |
| 5,708,825 A | 1/1998 | Sotomayor | 395/762 |
| 5,715,415 A | 2/1998 | Dazey et al. | 715/708 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,764,794 A | 6/1998 | Perlin | 382/186 |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 707/501 |
| 5,799,068 A | 8/1998 | Kikinis et al. | 379/93.06 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,822,720 A | 10/1998 | Bookman et al. | 704/3 |
| 5,826,025 A | 10/1998 | Gramlich | 395/200.47 |
| 5,832,100 A | 11/1998 | Lawton et al. | 382/100 |
| 5,845,077 A | 12/1998 | Fawcett | 709/221 |
| 5,855,007 A | 12/1998 | Jovicic et al. | 705/14 |
| 5,859,636 A * | 1/1999 | Pandit | 715/501.1 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,884,266 A | 3/1999 | Dvorak | 704/270.1 |
| 5,892,919 A | 4/1999 | Nielsen | 395/200.58 |
| 5,893,073 A | 4/1999 | Kasso et al. | 705/8 |
| 5,893,132 A | 4/1999 | Huffman et al. | 715/201 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,139 A | 8/1999 | Feigner et al. | 715/708 |
| 5,933,140 A | 8/1999 | Strahorn et al. | 715/712 |
| 5,933,498 A | 8/1999 | Schneck et al. | 705/54 |
| 5,940,614 A | 8/1999 | Allen et al. | 717/120 |
| 5,944,787 A | 8/1999 | Zoken | 709/206 |
| 5,946,647 A * | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A * | 10/1999 | Beauregard et al. | 707/6 |
| 5,987,480 A | 11/1999 | Donohue et al. | 715/501.1 |
| 5,991,719 A | 11/1999 | Yazaki et al. | 704/251 |
| 5,995,756 A | 11/1999 | Hermann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,028,605 A * | 2/2000 | Conrad et al. | 715/840 |
| 6,029,135 A | 2/2000 | Krasle | 704/275 |
| 6,029,171 A | 2/2000 | Smiga et al. | 707/102 |
| 6,031,525 A | 2/2000 | Perlin | 345/173 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,072,475 A | 6/2000 | Van Ketwich | 345/173 |
| 6,073,090 A * | 6/2000 | Fortune et al. | 704/8 |
| 6,085,201 A | 7/2000 | Tso | 707/505 |
| 6,088,711 A | 7/2000 | Fein et al. | 715/523 |
| 6,092,074 A | 7/2000 | Rodkin et al. | 707/102 |
| 6,108,640 A | 8/2000 | Slotznick | 705/26 |
| 6,108,674 A * | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | |
| 6,126,306 A | 10/2000 | Ando | 708/605 |
| 6,137,911 A * | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,469 A | 12/2000 | Safai et al. | 710/62 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 * | 2/2001 | Snow et al. | 707/1 |
| 6,185,576 B1 * | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | 715/705 |
| 6,219,698 B1 | 4/2001 | Iannucci et al. | 709/221 |
| 6,246,404 B1 | 6/2001 | Feigner et al. | 715/708 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,282,489 B1 | 8/2001 | Bellesfield et al. | 701/201 |
| 6,291,785 B1 | 9/2001 | Koga et al. | 209/584 |
| 6,292,768 B1 | 9/2001 | Chan | 704/1 |
| 6,295,061 B1 | 9/2001 | Park et al. | 715/764 |
| 6,297,822 B1 | 10/2001 | Feldman | 715/705 |
| 6,300,950 B1 | 10/2001 | Clark et al. | 715/705 |
| 6,308,171 B1 | 10/2001 | De La Huerga | 707/3 |
| 6,311,152 B1 | 10/2001 | Bai et al. | 704/9 |
| 6,311,177 B1 | 10/2001 | Dauerer et al. | 707/2 |
| 6,311,194 B1 | 10/2001 | Sheth et al. | 715/505 |
| 6,320,496 B1 | 11/2001 | Sokoler et al. | 340/470.1 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe et al. | 709/203 |
| 6,338,059 B1 | 1/2002 | Fields et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,381,742 B2 | 4/2002 | Forbes et al. | 717/176 |
| 6,382,350 B1 | 5/2002 | Jezewski et al. | 181/290 |
| 6,392,668 B1 | 5/2002 | Murray | 715/38 |
| 6,396,515 B1 | 5/2002 | Hetherington et al. | 715/762 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,415,304 B1 | 7/2002 | Horvitz | 715/205 |

| Patent | Date | Inventor | Class |
|---|---|---|---|
| 6,421,678 B2 | 7/2002 | Smiga et al. | 707/102 |
| 6,424,979 B1 | 7/2002 | Livingston et al. | 715/511 |
| 6,434,567 B1 | 8/2002 | De La Huerga | 707/102 |
| 6,438,545 B1 * | 8/2002 | Beauregard et al. | 707/6 |
| 6,441,753 B1 | 8/2002 | Montgomery | 341/34 |
| 6,442,545 B1 | 8/2002 | Feldman et al. | 707/8 |
| 6,442,591 B1 | 8/2002 | Haynes et al. | 709/206 |
| 6,456,304 B1 | 9/2002 | Angiulo et al. | 715/779 |
| 6,470,091 B2 | 10/2002 | Koga et al. | 382/101 |
| 6,473,069 B1 | 10/2002 | Gerpheide | 345/157 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,498,982 B2 | 12/2002 | Bellesfield et al. | 701/202 |
| 6,510,504 B2 | 1/2003 | Satyanarayanan | 711/170 |
| 6,516,321 B1 | 2/2003 | De La Huerga | 707/102 |
| 6,519,557 B1 | 2/2003 | Emens et al. | 704/8 |
| 6,519,603 B1 | 2/2003 | Bays et al. | |
| 6,546,433 B1 | 4/2003 | Matheson | 709/318 |
| 6,553,385 B2 | 4/2003 | Johnson et al. | 707/104.1 |
| 6,556,972 B1 | 4/2003 | Bakis et al. | 704/277 |
| 6,556,984 B1 | 4/2003 | Zien | 707/2 |
| 6,564,264 B1 | 5/2003 | Creswell et al. | 709/245 |
| 6,571,241 B1 | 5/2003 | Nosohara | 707/6 |
| 6,571,253 B1 | 5/2003 | Thompson et al. | 707/103 R |
| 6,591,260 B1 | 7/2003 | Schwarzhoff et al. | 707/2 |
| 6,595,342 B1 | 7/2003 | Maritzen et al. | 194/212 |
| 6,601,075 B1 | 7/2003 | Huang et al. | 707/104.1 |
| 6,604,099 B1 | 8/2003 | Chung et al. | 707/3 |
| 6,615,131 B1 | 9/2003 | Rennard et al. | 701/200 |
| 6,618,733 B1 | 9/2003 | White et al. | |
| 6,622,140 B1 | 9/2003 | Kantrowitz | 707/5 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,643,650 B1 | 11/2003 | Slaughter et al. | 707/10 |
| 6,654,734 B1 | 11/2003 | Mani et al. | 707/2 |
| 6,654,932 B1 | 11/2003 | Bahrs et al. | 715/507 |
| 6,658,623 B1 | 12/2003 | Schilit et al. | 715/513 |
| 6,687,485 B2 | 2/2004 | Hopkins et al. | 434/350 |
| 6,694,307 B2 | 2/2004 | Julien | 707/3 |
| 6,697,824 B1 | 2/2004 | Bowman-Amuah | 709/229 |
| 6,697,837 B1 | 2/2004 | Rodov | 709/203 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,741,994 B1 | 5/2004 | Kang et al. | 707/102 |
| 6,742,054 B1 | 5/2004 | Upton, IV | 710/6 |
| 6,745,208 B2 | 6/2004 | Berg et al. | 707/201 |
| 6,766,326 B1 | 7/2004 | Cena | 707/101 |
| 6,795,808 B1 | 9/2004 | Strubbe et al. | 704/275 |
| 6,802,061 B1 | 10/2004 | Parthasarathy et al. | 717/173 |
| 6,826,726 B2 | 11/2004 | Hsing et al. | 715/513 |
| 6,829,631 B1 | 12/2004 | Forman et al. | 709/202 |
| 6,845,499 B2 | 1/2005 | Srivastava et al. | 717/100 |
| 6,857,103 B1 | 2/2005 | Wason | 715/709 |
| 6,859,908 B1 | 2/2005 | Clapper | 715/224 |
| 6,868,525 B1 | 3/2005 | Szabo | 715/738 |
| 6,874,125 B1 | 3/2005 | Carroll et al. | 715/705 |
| 6,874,143 B1 | 3/2005 | Murray et al. | 717/173 |
| 6,880,129 B1 | 4/2005 | Lee et al. | 715/763 |
| 6,883,137 B1 * | 4/2005 | Girardot et al. | 715/513 |
| 6,898,604 B1 | 5/2005 | Ballinger et al. | 707/101 |
| 6,901,402 B1 | 5/2005 | Corston-Oliver et al. | 701/101 |
| 6,904,560 B1 | 6/2005 | Panda | 715/202 |
| 6,925,457 B2 | 8/2005 | Britton et al. | 707/1 |
| 6,925,470 B1 | 8/2005 | Sangudi et al. | 707/102 |
| 6,944,857 B1 | 9/2005 | Glaser et al. | 717/173 |
| 6,948,133 B2 | 9/2005 | Haley | 715/780 |
| 6,950,831 B2 | 9/2005 | Haley | 707/104.1 |
| 6,950,982 B1 | 9/2005 | Dourish | 715/512 |
| 6,957,385 B2 | 10/2005 | Chan et al. | 715/504 |
| 6,963,867 B2 * | 11/2005 | Ford et al. | 707/3 |
| 6,964,010 B1 | 11/2005 | Sharp | 715/507 |
| 6,975,983 B1 * | 12/2005 | Fortescue et al. | 704/9 |
| 6,976,090 B2 | 12/2005 | Ben-Shaul et al. | 709/246 |
| 6,976,209 B1 | 12/2005 | Storisteanu et al. | 715/512 |
| 6,981,212 B1 | 12/2005 | Claussen et al. | 715/205 |
| 6,986,104 B2 | 1/2006 | Green et al. | 715/523 |
| 6,990,654 B2 | 1/2006 | Carroll, Jr. | 717/109 |
| 7,003,522 B1 | 2/2006 | Reynar et al. | 707/10 |
| 7,013,289 B2 | 3/2006 | Horn et al. | 705/26 |
| 7,024,658 B1 | 4/2006 | Cohen et al. | 717/117 |
| 7,028,312 B1 * | 4/2006 | Merrick et al. | 719/330 |
| 7,032,174 B2 | 4/2006 | Montero et al. | 715/257 |
| 7,039,859 B1 | 5/2006 | Sundaresan | 715/229 |
| 7,051,076 B2 | 5/2006 | Tsuchiya | 709/206 |
| 7,082,392 B1 | 7/2006 | Butler et al. | 704/233 |
| 7,100,115 B1 | 8/2006 | Yennaco | 715/748 |
| 7,113,976 B2 | 9/2006 | Watanabe | 709/206 |
| 7,146,564 B2 | 12/2006 | Kim et al. | 715/235 |
| 7,216,351 B1 | 5/2007 | Maes | 719/328 |
| 7,237,190 B2 | 6/2007 | Rollins et al. | 715/234 |
| 7,281,245 B2 | 10/2007 | Reynar et al. | 717/173 |
| 7,302,634 B2 | 11/2007 | Lucovsky et al. | 715/200 |
| 7,305,354 B2 | 12/2007 | Rodriguez et al. | 705/36 |
| 7,392,479 B2 | 6/2008 | Jones et al. | 715/513 |
| 7,421,645 B2 | 9/2008 | Reynar | 715/206 |
| 7,454,459 B1 | 11/2008 | Kapoor et al. | 709/203 |
| 2001/0029605 A1 | 10/2001 | Forbes et al. | 717/11 |
| 2001/0041328 A1 | 11/2001 | Fisher | 434/157 |
| 2001/0042098 A1 | 11/2001 | Gupta et al. | 709/206 |
| 2001/0049702 A1 | 12/2001 | Najmi | 707/513 |
| 2001/0056461 A1 | 12/2001 | Kampe et al. | 709/201 |
| 2002/0002590 A1 | 1/2002 | King et al. | 709/206 |
| 2002/0003469 A1 | 1/2002 | Gupta | 340/407.1 |
| 2002/0003898 A1 | 1/2002 | Wu | 382/187 |
| 2002/0004803 A1 | 1/2002 | Serebrennikov | 715/513 |
| 2002/0007309 A1 | 1/2002 | Reynar | 705/14 |
| 2002/0023113 A1 | 2/2002 | Hsing et al. | 707/513 |
| 2002/0023136 A1 | 2/2002 | Silver et al. | 709/206 |
| 2002/0026450 A1 | 2/2002 | Kuramochi | 707/104.1 |
| 2002/0035581 A1 | 3/2002 | Reynar et al. | 715/513 |
| 2002/0038180 A1 | 3/2002 | Bellesfield et al. | 701/202 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0091803 A1 | 7/2002 | Imamura et al. | 709/220 |
| 2002/0099687 A1 | 7/2002 | Krishnaprasad et al. | 707/1 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0110225 A1 | 8/2002 | Cullis | 379/67.1 |
| 2002/0111928 A1 | 8/2002 | Haddad | 707/1 |
| 2002/0120685 A1 | 8/2002 | Srivastava et al. | 709/203 |
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156774 A1 | 10/2002 | Beauregard et al. | 707/3 |
| 2002/0156792 A1 | 10/2002 | Gomboez et al. | 707/100 |
| 2002/0169802 A1 | 11/2002 | Brewer et al. | 707/513 |
| 2002/0175955 A1 | 11/2002 | Gourdol et al. | 345/821 |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |

| | | | | | | |
|---|---|---|---|---|---|---|
| 2003/0005411 | A1 | 1/2003 | Gerken ................ 717/120 | JP | 08-272662 | 10/1996 |
| 2003/0009489 | A1 | 1/2003 | Griffin ................ 707/500 | JP | 09-138636 | 5/1997 |
| 2003/0014745 | A1 | 1/2003 | Mah et al. ............. 717/170 | JP | 10-171827 | 6/1998 |
| 2003/0025728 | A1 | 2/2003 | Ebbo et al. ............ 345/744 | JP | 2000-222394 | 8/2000 |
| 2003/0046316 | A1 | 3/2003 | Gergic et al. .......... 707/513 | JP | 2000-231566 | 8/2000 |
| 2003/0050911 | A1 | 3/2003 | Lucovsky et al. ........ 707/1 | JP | 2001-014303 | 1/2001 |
| 2003/0051236 | A1 | 3/2003 | Pace et al. ............ 717/177 | JP | 2001-125994 | 5/2001 |
| 2003/0056207 | A1 | 3/2003 | Fischer et al. ......... 717/174 | JP | 2001-522112 | 11/2001 |
| 2003/0081791 | A1 | 5/2003 | Erickson et al. ........ 380/282 | JP | 2001-350464 | 12/2001 |
| 2003/0083910 | A1 | 5/2003 | Sayal et al. ........... 705/7 | JP | 2002-041353 | 2/2002 |
| 2003/0084138 | A1 | 5/2003 | Tavis et al. ........... 709/223 | JP | 2002163250 A | 6/2002 |
| 2003/0097318 | A1 | 5/2003 | Yu et al. .............. 705/35 | JP | 2002-222181 | 8/2002 |
| 2003/0101190 | A1 | 5/2003 | Horvitz et al. ......... 707/100 | JP | 2003-141174 | 5/2003 |
| 2003/0101204 | A1 | 5/2003 | Watson ................. 708/206 | WO | WO 95/07510 A1 | 3/1995 |
| 2003/0101416 | A1 | 5/2003 | McInnes et al. ......... 715/513 | WO | WO 99/17240 A1 | 4/1999 |
| 2003/0106040 | A1 | 6/2003 | Rubin et al. ........... 717/106 | WO | WO 00/54174 A1 | 9/2000 |
| 2003/0115039 | A1 | 6/2003 | Wang ................... 704/4 | WO | WO 00/67117 | 11/2000 |
| 2003/0121033 | A1 | 6/2003 | Peev et al. ............ 717/175 | WO | WO 00/73949 A1 | 12/2000 |
| 2003/0126136 | A1 | 7/2003 | Omoigui ................ 707/10 | WO | WO 01/18687 A1 | 3/2001 |
| 2003/0140308 | A1 | 7/2003 | Murthy et al. .......... 715/500 | WO | WO 01/37170 A2 | 5/2001 |
| 2003/0154144 | A1 | 8/2003 | Pokorny et al. ......... 705/28 | WO | WO 01/186390 A2 | 11/2001 |
| 2003/0158841 | A1 | 8/2003 | Britton et al. ......... 707/3 | WO | WO 02/99627 A1 | 1/2002 |
| 2003/0158851 | A1 | 8/2003 | Britton et al. ......... 707/100 | WO | WO 02/15518 A2 | 2/2002 |
| 2003/0167445 | A1 | 9/2003 | Su et al. .............. 715/513 | WO | WO 02/42928 A1 | 5/2002 |
| 2003/0172343 | A1 | 9/2003 | Leymaster et al. ....... 715/500 | WO | WO 2004/012099 A2 | 2/2004 |
| 2003/0177341 | A1 | 9/2003 | Devillers .............. 712/227 | | | |
| 2003/0182391 | A1 | 9/2003 | Leber et al. ........... 709/217 | | | |
| 2003/0192040 | A1 | 10/2003 | Vaughan ................ 717/173 | | | |
| 2003/0195937 | A1 | 10/2003 | Kircher et al. ......... 709/207 | | | |
| 2003/0212527 | A1 | 11/2003 | Moore et al. ........... 702/179 | | | |
| 2003/0220795 | A1 | 11/2003 | Arayasantiparb et al. .. 704/275 | | | |
| 2003/0229593 | A1 | 12/2003 | Raley et al. ........... 705/55 | | | |
| 2003/0233330 | A1 | 12/2003 | Raley et al. ........... 705/55 | | | |
| 2004/0002939 | A1 | 1/2004 | Arora et al. ........... 707/1 | | | |
| 2004/0003389 | A1 | 1/2004 | Reynar et al. .......... 717/178 | | | |
| 2004/0006564 | A1 | 1/2004 | Lucovsky et al. ........ 707/10 | | | |
| 2004/0006741 | A1 | 1/2004 | Radja et al. ........... 715/513 | | | |
| 2004/0024875 | A1 | 2/2004 | Horvitz et al. ......... 709/226 | | | |
| 2004/0039990 | A1 | 2/2004 | Bakar et al. ........... 715/505 | | | |
| 2004/0044959 | A1 | 3/2004 | Shanmugasundaram et al. .. 715/513 | | | |
| 2004/0068694 | A1 | 4/2004 | Kaler et al. ........... 715/513 | | | |
| 2004/0083218 | A1 | 4/2004 | Feng ................... 707/100 | | | |
| 2004/0133846 | A1 | 7/2004 | Khoshatefeh et al. ..... 715/500 | | | |
| 2004/0143581 | A1 | 7/2004 | Bohannon et al. ........ 707/100 | | | |
| 2004/0165007 | A1 | 8/2004 | Shafron ................ 345/781 | | | |
| 2004/0199861 | A1 | 10/2004 | Lucovsky ............... 715/500 | | | |
| 2004/0201867 | A1 | 10/2004 | Katano ................. 358/1.15 | | | |
| 2004/0236717 | A1 | 11/2004 | Demartini et al. ....... 707/1 | | | |
| 2005/0050164 | A1 | 3/2005 | Burd et al. ............ 709/217 | | | |
| 2005/0055330 | A1 | 3/2005 | Britton et al. ......... 707/1 | | | |
| 2005/0094850 | A1 | 5/2005 | Nakao .................. 382/103 | | | |
| 2005/0108195 | A1 | 5/2005 | Yalovsky et al. ........ 707/1 | | | |
| 2005/0120313 | A1 | 6/2005 | Rudd et al. ............ 715/866 | | | |
| 2005/0187926 | A1 | 8/2005 | Britton et al. ......... 707/3 | | | |
| 2006/0173674 | A1 | 8/2006 | Nakajima et al. ........ 704/9 | | | |

FOREIGN PATENT DOCUMENTS

| | | |
|---|---|---|
| CN | ZL200410005390 | 10/2008 |
| EP | 0 364 180 A2 | 4/1990 |
| EP | 0481784 A2 | 4/1992 |
| EP | 0598511 A2 | 5/1994 |
| EP | 0 872 827 A2 | 10/1998 |
| EP | 0810520 B1 | 12/1998 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| EP | 1 452 966 A3 | 9/2004 |
| JP | 64-88771 | 4/1989 |
| JP | 05-174013 | 7/1993 |

OTHER PUBLICATIONS

Technique for Automatically Correcting Words in Text; Karen Kukich;*ACM Comput. Surv.*, 24, 4 (Dec. 1992); pp. 377-439.

Putting People First: Specifying Proper Names in Speech Interfaces, Matt Marx and Chris Schmandt; *Proceedings of the ACM Symposium on User Interface Software and Technology*; 1994; pp. 29-37.

Interface and execution models in the fluke kernel; Bryan Ford, Mike Hibler, Jay Lepreau, Roland McGrath and Patrick Tullman; *Proceedings of the third symposium on operating systems design and implementation*, (1999) p. 101-115.

Exploring the applications user-expertise assessment for intelligent interfaces; Michel C. Desmarais and Jiming Liu; *Proceedings of the conference on human factors in computing systems*, (1993) p. 308-313.

Future directions in user-computer interface software; James D. Foley; *Conference proceedings on organizational computer systems*, (1991) p. 289-297.

Human-computer interface development: concepts and systems for its management H. Rex Hartson and Deborah Hix; *ACM Comput. Surv.* 1 (Mar. 1989) p. 5-92.

Integrating computer technology, people technology; strategies and case studies from Georgia Tech's Graphics, Visualization and Usability Center; Jim Foley; *Proceedings of the workshop on advanced visual interfaces*, (1994) p. 34-43.

Command management system for next-generation user input; M. Tsai, P. Reiher and G.J. Popek; *Proceedings of the seventh workshop on hottopics in operating systems*, (1999) p. 17984.

U.S. Appl. No. 09/818,157, filed Mar. 27, 2001, entitled "Automatically Adding Proper Names to a Database."

U.S. Appl. No. 09/841,265, filed Apr. 24, 2001, entitled "Method and System for Applying Input Mode Bias."

U.S. Appl. No. 09/841,266, filed Apr. 24, 2001, entitled "Method and System for Providing Electronic Commerce Actions Based on Semantically Labeled Strings."

U.S. Appl. No. 09/906,552, filed Jul. 16, 2001, entitled "Method and System for Providing Restricted Actions for Recognized Semantic Categories."

U.S. Appl. No. 09/906,467, filed Jul. 16, 2001, entitled "Application Program Interfaces for Semantically Labeling Strings and Providing Actions Based on Semantically Labeled Strings."

U.S. Appl. No. 09/588,411, filed Jun. 6, 2000, entitled "Method and System for Semantically Labeling Strings and Providing Actions Based on Semantically Labeled Strings."

U.S. Appl. No. 10/141,712, filed May 9, 2002, entitled "Method, System, and Apparatus for Converting Dates Between Calendars and Languages Based Upon Semantically Labeled Strings."

U.S. Appl. No. 10/154,630, filed May 23, 2002, entitled "Method, System, and Apparatus for Converting Numbers Based Upon Semantically Labeled Strings."

U.S. Appl. No. 10/140,544, filed May 7, 2002, entitled "Method, System, and Apparatus for Converting Numbers Between Measurement Systems Based Upon Semantically Labeled Strings."

U.S. Appl. No. 10/155,680, filed May 23, 2002, entitled "Method, System, and Apparatus for Converting Currency Values Based Upon Semantically Labeled Strings."

U.S. Appl. No. 10/179,810, filed Jun. 25, 2002, entitled "Method, System, and Apparatus for Performing Custom Actions on Digital Content."

U.S. Appl. No. 10/178,680, filed Jun. 24, 2002, entitled "System and Method for Incorporating Smart Tags in Online Content."

U.S. Appl. No. 10/179,438, filed Jun. 25, 2002, entitled "Method and System for Dynamically Providing Actions Associated with Semantically Labeled Strings."

U.S. Appl. No. 10/184,298, filed Jun. 27, 2002, entitled "Method and System for Associating Actions with Semantic Labels in Electronic Documents."

Design methodology and formal validation of hypermedia documents; C.A.S. Santos, L.F.G Soares, G.L. de Souza and J.P. Courtiat; *Proceedings of the sixth ACM international conference on multimedia*, (1998) p. 39-48.

Constructing, organizing, and visualizing collections of tropically related Web resources; Loren Terveen, Will Hill and Brian Amento; *ACM Trans. Comput.-um. Interact.* 6, 1 (Mar. 1999) p. 67-94.

How to personalize the Web; Rob Barrett, Paul P. Maglio and Daniel C. Kellem; *Conference proceedings on human factors in computing systems* (1997) p. 75-82.

CLUES; dynamic personalized message filtering; Matthew Marx and Chris Schmandt; *Proceedings of the ACM 1996 conference on computer supported cooperative work* (1996) p. 113-121.

Dynamic hyperlink generation for navigation in relational databases; Karl M. Goschka and Jurgen Falb; *Proceedings of the tenth ACM conference on hypertext and hypermedia: returning to our diverse roots* (1999) p. 23-24.

Percepual user interfaces: perceptual intelligence; Alex Pentland; *Commun. ACM* 43, 3 (Mar. 2000) p. 35-44.

Textual context analysis for information retrieval; Mark A. Stairmand; *Proceedings of the 20th annual international ACM SIGIR conference on research and development in information retrieval* (1997) p. 140-147.

An-XML framework for agent-based E-commerce; Robert J. Glushko, Jay M. Tenenbaum and Bart Meltzer; Commun. ACM 42, 3 (Mar. 1999) p. 106.

Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/_Man_NeXT_html/html, http://duplex.hypermart.net/books.bsd/501-504.html, pp. 1-20.

Kuenning, Geoff, "International Ispell," Version 3.1.00, Oct. 8, 1993, http://www.rt.com/man/findaffix.1.html, http://www.csee.usf.edu/cgi-bin/man-cig?ispell, http://fmg-www.cs.ucla.edu/geoff/ispell.html, pp. 1-33.

Kuenning, Geoff, "Ispell, v. 3.1," http://theochem.ki.ku.dk/on_line_docs/ispell/ispell_1.html, pp. 1-6.

"UNIX Man Pages: sed," http://www.calpoly.edu/cgi-bin/man-cgi?spell+1, pp. 1-14.

McMahon, Lee. E., "SED—A Non-Interactive Text Editor," Bell Laboratories, Murray Hill, New Jersey 07974, pp. 1-15.

Beitner, N.D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester M13 9PL, UK, pp. 1-12.

IBM Corporation, IBM Research Disclosure #368; "Multimedia Hyperlinks Automatically Created For Reference Documents," *IBM Technical Disclosure* Bulletin, Jun. 1993, pp. 1-5.

The Complete LINUX™ Operating System 5.2 Deluxe, Red Hat, Macmillian Digital Publishing USA, A Viacom Company, Red Hat Software, Inc., ISBN 1-57595-199-1B, pp. 1-385.

User Manual For AddressMate and AddressMate Plus, CoStar Corporation, AddressMate Software, 1994-1995, pp. 1-210.

Getting Results With Microsoft Office 97, *Real World Solutions For The Work You Do*, Microsoft Corporation, pp. 1-703.

InfoCentral™ 7, User's Manual, Corel Corporation, vol. 1, Version 7.0, 1996, pp. 1-86.

Corel Office Profession 7 Quick Results User's Manual, vol. 1, Version 7.0 (first printing), Corel Corporation, Limited, pp. 1-531.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.

U.S. Official Action dated May 26, 2006 in U.S. Appl. No. 09/588,411, filed Jun. 6, 2000.

U.S. Official Action dated May 31, 2006 in U.S. Appl. No. 10/141,712, filed May 9, 2002.

U.S. Official Action dated Jun. 1, 2006 in U.S. Appl. No. 10/366,141, filed Feb. 13, 2003.

European Communication dated Dec. 11, 2006 in EP 03 012 830.0-2211.

Singapore Search Report/Written Opinion dated Jan. 26, 2007 in SG 200500214-2.

U.S. Official Action dated Feb. 7, 2007 cited in U.S. Appl. No. 10/179,438.

U.S. Official Action dated Feb. 21, 2007 cited in U.S. Appl. No. 10/366,141.

European Communication dated Apr. 19, 2006 in EP 05 000 506.5-1527.

U.S. Official Action dated Dec. 20, 2006 in U.S. Appl. No. 10/154,630.

U.S. Final Official Action dated Dec. 26, 2006 in U.S. Appl. No. 10/179,810.

U.S. Official Action dated Jan. 5, 2007 in U.S. Appl. No. 10/183,717.

U.S. Official Action dated Jan. 11, 2007 in U.S. Appl. No. 10/184,190.

U.S. Official Action dated Jan. 25, 2007 in U.S. Appl. No. 10/608,267.

European Communication dated Nov. 9, 2006 in EP 03010292.5.

"World 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.

"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.

U.S. Office Action dated Nov. 9, 2006 cited in U.S. Appl. No. 10/184,298.

U.S. Office Action dated Nov. 15, 2006 cited in U.S. Appl. No. 10/179,438.

European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2'-Core.pdf, Nov. 2000, 107 pp.

U.S. Final Official Action dated Oct. 19, 2006 cited in U.S. Appl. No. 09/906,467.

U.S. Official Action dated Sep. 28, 2006 cited in U.S. Appl. No. 10/608,267.
U.S. Final Official Action dated Oct. 5, 2006 cited in U.S. Appl. No. 09/841,266.
U.S. Official Action dated Oct. 6, 2006 cited in U.S. Appl. No. 10/140,544.
U.S. Official Action dated Oct. 10, 2006 cited in U.S. Appl. No. 09/841,265.
U.S. Official Action dated Sep. 7, 2006 cited in U.S. Appl. No. 10/155,680.
U.S. Official Action dated Aug. 9, 2006 cited in U.S. Appl. No. 10/164,960.
Devanbue, P. et al., "Chime: customizable hyperlink insertion and maintenance engine for software engineering environments", Software Engineering, Publication date: 1999, ISBN: 1-58113-07400.
"Using Flyswat", http://www.flywsat.com/using.html, download date: Sep. 28, 1999, 1 pp.
"What is Flyswat", http://www.flyswat.com, download date: Sep. 28, 1999, 5 pp.
"Intelligent Text Processing: About", http://www.syntalex.co.uk/about.html, download date: August 7, 1999, 1 pp.
"Intelligent Text Processing: Automatic Cross-Referencing", http://www.syntalex.co.uk/services/acrl.html, download date Aug. 7, 1999, 3 pp.
"Intelligent Text Processing: Case Study: Context", http://www.syntalex.co.uk/casestudies/context.html, download date: Aug. 7, 1999, 3 pp.
European Communication dated Feb. 16, 2007 cited in European Application No. 04 003 683.2-2211.
Anonymous, "Adding Data from Other Sources in PowerPoint 2002," Jul. 2002, Internet article XP-002420700, A Professional Approach Series the E-Zine Approach, http://www.glencoe.com/ps/computered/pas/article.php4?articleId-437, 8 pgs.
Rice, F.C., "Transform XML Files with XSLT When Importing into Microsoft Excel 2002," Jul. 2001, Internet article, XP-002420701, http://msdn2.microsoft.com/en-us/library/aa140055(office.10.d=printer).aspx, 9 pgs.
Johnson, L., "What's So Special About Paste Special?", Jun. 2002, Internet article, XP-002420702, http://pubs.logicalexpressions.com/Pub0009/LPMArticle.asp?ID=40, 5 pgs.
U.S. Official Action dated Mar. 9, 2007 cited in U.S. Appl. No. 10/426,446.
U.S. Official Action dated Mar. 12, 2007 cited in U.S. Appl. No. 10/141,712.
Russian Official Action dated Oct. 11, 2008 cited in Russian Appl. No. 2003118722.
Pershikov, V.I., "Explanatory Dictionary in Informatics," Finances and Statistics, Moscow, 1991 (in Russian with translated sections) 5 pgs.
U.S. Final Office Action dated Dec. 18, 2007 cited in U.S. Appl. No. 10/366,141.
U.S. Final Office Action dated Dec. 26, 2007 cited in U.S. Appl. No. 09/841,265.
U.S. Office Action dated Dec. 26, 2007 cited in U.S. Appl. No. 10/377,258.
U.S. Final Office Action dated Jan. 7, 2008 cited in U.S. Appl. No. 10/179,438.
U.S. Office Action dated Jan. 9, 2008 cited in U.S. Appl. No. 09/906,467.
David D. Lewis et al., "A Sequential Algorithm for Training Text Classifiers," Spring-Verlag New York, Inc., 1994, pp. 1-10.
U.S. Office Action dated Jan. 25, 2008 cited in U.S. Appl. No. 10/608,267.
Malaysian Search Report dated Aug. 2, 2007 cited in Malaysian Application No. PI 20040265.
U.S. Office Action dated Sep. 27, 2007 cited in U.S. Appl. No. 10/608,267.
U.S. Appl. No. 11/924,856 filed Oct. 26, 2007 entitled "Providing Contextually Sensitive Tools and Help Content in Computer-Generated Documents".
U.S. Office Action dated Oct. 9, 2007 cited in U.S. Appl. No. 10/183,317.
U.S. Office Action dated Oct. 17, 2007 cited in U.S. Appl. No. 10/155,680.
U.S. Final Office Action dated Oct. 19, 2007 cited in U.S. Appl. No. 10/184,190.
U.S. Final Office Action dated Oct. 19, 2007 cited in U.S. Appl. No. 09/588,411.
U.S. Final Office Action dated Oct. 19, 2007 cited in U.S. Appl. No. 10/141,712.
U.S. Final Office Action dated Oct. 30, 2007 cited in U.S. Appl. No. 09/906,552.
European Communication dated Sep. 25, 2007 cited in European Application No. 03 014 181.6-1243.
Japnese Official Action dated Oct. 19, 2007 cited in Japanese Application No. 2003-128417.
Rubin, Charles, "Microsoft Word 2000 Official Manual," First Edition, Nikkei BP Soft Press, Inc., Aug. 2, 1999, pp. 215-217.
U.S. Final Office Action dated Dec. 7, 2007 cited in U.S. Appl. No. 10/426,446.
U.S. Office Action dated Feb. 8, 2008 cited in U.S. Appl. No. 10/141,712.
U.S. Office Action dated Feb. 15, 2008 cited in U.S. Appl. No. 10/731,899.
U.S. Final Office Action dated Feb. 20, 2008 cited in U.S. Appl. No. 10/154,630.
Singapore Examination Reported (conducted by Austrian Patent Office) dated Jan. 25, 2008 cited in SG Appl. No. 200500214-2.
Chinese Official Action dated Dec. 28, 2007 cited in Application No. 200410005390.8.
Chinese Official Action dated Jan. 4, 2008 cited in Application No. 200510009487.0.
Wei Ying-bin et al., "A New Technology ColdFusion of Realizing Dynamic Webpage," 2000, 6 pgs. (English language translation, pp. 1-6).
European Examination Report dated Mar. 4, 2006 cited in EP Application No. 02 014 717.9-1527.
European Examination Report dated Mar. 4, 2006 cited in EP Application No. 03 012 432.5-1527.
Polish Official Letter dated Jun. 24, 2008 cited Polish Application No. P 365553.
U.S. Final Office Action dated Jul. 29, 2008 cited in U.S. Appl. No. 10/141,712.
"XML Schema Part 2: Datatypes,"W3C, May 2, 2001, http://www.w3.org/TR/2001/REC-xmlschema-2-20010502/, pp. 1-146 (separated into 2 documents—A & B).
U.S. Office Action dated Aug. 1, 2008 cited in U.S. Appl. No. 10/366,141.
Ghamrawi et al., "Collective Multi-Label Classification," ACM, 2005, pp. 195-200.
Polish Official Action dated Jul. 12, 2008 cited in Polish Application No. P 364854.
Japanese Office Action dated Jul. 18, 2008 cited in Japanese Application No. 2002-207514.
Rubin, C., "Microsoft Word 2000 Official Manual", First Edition, Nikkei BP Soft Press, Inc., Aug. 2, 1999, pp. 215-217.
U.S. Office Action dated May 27, 2008 cited in U.S. Application No. 09/906,552.
U.S. Examiner's Answer BPAI dated Jun. 5, 2008 cited in U.S. Application No. 10/184,298.
U.S. Office Action dated Jun. 11, 2008 cited in U.S. Application No. 09/841,265.
U.S. Office Action dated Jun. 12, 2008 cited in U.S. Application No. 10/426,446.
U.S. Office Action dated Jun. 13, 2008 cited in U.S. Application No. 10/780,376.
U.S. Final Office Action dated Jun. 27, 2008 cited in U.S. Application No. 10/377,258.
M. Stowe, "XML in Excel and the Spreadsheet Component", Microsoft Corporation, Aug. 2001, 6 pgs.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.

European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited in Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 18, 2008 cited in Japanese Application No. 2003-128417.
Hewkin, "Smart Tags-the Distributed-Memory Resolution", IEE Review, Jun. 22, 1989, pp. 203-206.
Measuring Units Conversion Table—http://web.archie.org- 1997 Internet French Property, pp. 1-4.
IBM Technical Disclosure Bulletin, "National Language Support Enhancement for Culture-Specific Operations", Nov. 1, 1993, vol. 36, Issue 11, pp. 629-638.
Towers, J. Tarin, Visual Quickstart Guide: Dreamweaver 2 for Windows and Macintosh, 1999, Peachpit Press, pp. 150-151.
Driza, Scott, "Learn Word 2000 VBA Document Automation", Wordware Publishing Inc., 2001, 6 pp.
Cornell, Paul, "Developing Smart Tag DLLs", MSDN Library, http://msdn.microsoft.com/library/default.asp?url=/library/en-us/dnsmarttag/html/ode_smarttags.asp, Apr. 2001, pp. 8.
Menu Customizing, IBM Technical Disclosure Bulletin, vol. 34, No. 1, Jun. 1991, pp. 91-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Schulz, Charles, "Writing Applications for Uniform Operation on a Mainframe or PC: A Metric Coversion Program", Lockheed Missles & Space Company, Inc., Sunnyvale, CA, May 1990, pp. 348-361.
"Integrating with External Systems: iPlanet™ Unified Development Server", Sun Microsystems, Inc., Ver. 5.0, Aug. 2001, pp. 127-156.
Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.
Quin, Liam, "Extensible Markup Language (XML)", W3C Architecture Domain, http://web.archive.org/web/2002121962057/http://www.w3.org/XML/, 1996-2002, pp. 1-3.
Clark, James, and DeRose, Steve, "XML Path Language (XPath), Version 1.0", W3C, http://web.archive.org/web/2021010034434/http://www.w3.org/TR/xpath, 1999-2000, pp. 1-31.
"Microsoft BizTalk Server 2002—Using BizTalk Mapper", http://msdn.Microsoft.com/library/en-us/bts_2002/htm/lat_xmltools_map_intro_zkqb.asp . . . , Microsoft Corporation, 1999-2001, pp. 1-2.
"BizTalk Server 2002 Mapper User Interface", http://msdn.microsoft.com/library/en-us/bts_2002/htm/lat_xmltools_map_concept_codw . . . , Microsoft Corporation, 1999-2001, pp. 1.
"BizTalk Server 2002 Compiling Maps", http://msdn.microsoft.com/library/en-us/bts_2002/htm/lat_xmltools_map_concept_drgl.a . . . , Microsoft Corporation, 1999-2001, pp. 1.
"BizTalk Server 2002 Testing Maps", http://msdn.microsoft.com/library/en-us/bts_2002/htm/lat_xmltools_map_concept_fhhy.B . . . , Microsoft Corporation, 1999-2001, pp. 1-2.
"BizTalk Server 2002 View Links and Functoids By Using Grid Preview", http://msdn.microsoft.com/library/en-us/bts_2002/htm/lat_xmltools_map_check_fuwn.as . . . , Microsoft Corporation, 1999-2001, pp. 1.
"The StarOffice™ 6.0 Suite: New Features Guide", Sun Microsystems, V. 1.1, Jul. 2002, pp. 1-31.
"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.
"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.
"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.
"Microsoft Unveils Visual Studio.NET Enterprise Tools", Microsoft Corporation, http://microsoft.com/presspass/press/2001/may01/05-21vseepr.mspx, May 2001, pp. 1-4.
"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.
"How to Use XSL to Transform Excel XML Spreadsheet for Server-Side Use", http://support.microsoft.com/default.aspx?scid=kb;en-us;278976, Microsoft Corporation, Aug. 2004, pp. 1-7.
Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.
M. Fernandez et al., "SilkRoute: trading between relations and XML", Computer Networks, vol. 33, No. 1-6, Jun. 2000, pp. 723-745.
V. Braganholo,"Updating Relational Databases Through XML Views", Technical Report, Sep. 2002, pp. 1-61.
G. Falquet et al., "Design and Analysis of Active Hypertext Views on Databases", Information Sciences Institute, Jan. 2002, pp. 1-24.
S. Ceri et al., "Deriving Production Rules for Incremental View Maintenance", Proceedings of the 17th International Conference on Very Large Data Bases, Sep. 1991, pp. 577-589.
A. Bonifati,"Active Behaviors within XML Document Management", EDBT Ph. D. Workshop, Mar. 2000, pp. 1-4.
"Integrated Development Enviorment (IDE)", http://web.archive.org/web/2002060203224/http:altova.com/products_ide.html, Jun. 2002, pp. 1-2.
"Altova markup your mind!" http://web.archive.org/web/20021204211721/http://altova.com/products_ide.html, Dec. 2002, pp. 1-3.
Arbortext, "Arbortex and Accessibility", http://web.archive/org/web/20021219133536/www.arbortext.com/html/accessibility.html, Dec. 2002, pp. 1-5.
Arbortext, "XML Compliance, 100% Pure XML", http:web.archive.org/web/20021209185855/www.arbortext.com/html/xml_compliance, Dec. 2002, pp. 1-3.
Arbortext, "Schemas", http://web.archive.org/web/20021221023148/www.arbortext.com/html/schemas.html, Dec. 2002, pp. 1-3.
Arbortext, "Arbortext's Support for XSL-FO", http://web.archive.org/web/20021221021632/www.arbortext.com/html/xsl-fo.html. Dec. 2002, pp. 1-4.
Corel, "Corel XMetal4, Making XML Content Creation Easy", http://web.archive.org/web/20031118215158/www.corel.com/servlet/Satellite?pagename, Nov. 2003, pp. 1-2.
Corel, "Corel XMetal 4 and Interwoven TeamXML", http://web.archive.org/web/20030807211225/www.corel.com/futuretense_cs/ccurt/corel+xml+4+and+interwoven+teamxml.pdf, Aug. 2003, pp. 1-2.
Corel, "The Corel-XyEnterprise XML Solution", http://web.archive.org/web/2003807154355/www.corel.com/futuretense_cs/ccurl/corel+and+XY+enterprise+XML+solution.pdf, Aug. 2003, pp. 1-2.
Brooks-Bilson, "Programming ColdFusion" [electronic resource] 2001, Safari Tech Books Online, 1st Edition, 25 pp.
Wilker, John, "ColdFusion MX Adds J2EE, XML, and Web Services Compatibility", Aug. 9, 2002, http://builder.com.com/5102-6387-104585.html, 3 pp.
Homer, Alex et al., Professional Active Services Pages, 1997, Wrox Press Ltd., Section"Client-Side Scripting and Components", subsection "Choosing Your Applets, and Controls", 16 pp.
Flanagan, D., "JavaScript—The Definitive Guide, Fourth Edition", Jan. 2002, O'Reilly, 12 pp.
Brockschmidt, K., "Inside OLE, Second Edition", 1995, Microsoft Press, p. 169.

Toth, V., "Visual C++4 Unleashed", 1996, Sams Publishing, p. 174.
Sriram, V., "ComponentXchange: An E-Exchange for Software Components", Master Thesis, CitSeer, May 2001, pp. i-v, 1-77.
Bosak, "XML: The Universal Publishing Format", SGML/XML Europe '98, May 1998, pp. A1-C17.
Kristensen, "Template Resolution in XML/HTML", Computer Networks and ISDN Systems, vol. 30, 1998, pp. 239-249.
Fan et al., "FormPlus: A Form Authoring Toolkit", Proceedings of the Fourteenth Annual Computer Software and Applications Conference, Oct. 31, 1990-Nov. 2, 1990, pp. 255-260.
Boone, "Concept Features in Re: Agent, An Intelligent Email Agent", Proceedings of the 2nd International Conference on Autonomous Agents, May, 9-13, 1998, pp. 141-148.
Takkinen et al., "CAFÉ: A Conceptual Model for Managing Information in Electronic Mail", Proceedings of the Annual Hawaii International Conference on System Sciences, 1998, pp. 44-53.
"Smart Tags: Dumb Technology?", webreference.com, Online, Aug. 29, 2001, http://www.webreference.com/xml/column30/3.html, 3 pp.
"Being 'Smart' with Smart Tags in Office XP", Create for Mississippi, Aug. 2001, http://www.create.ceti.msstate.edu/create/howto/smart_tags.pdf, 7 pp.
U.S. Appl. No. 10/164,960, filed Jun. 6, 2002, entitled "Providing Contextually Sensitive Actions and Help Content in Computer-Generated Documents".
U.S. Appl. No. 10/164,260, filed Jun. 5, 2002, entitled "Mechanism for Downloading Software Components from a Remote Source for Use by a Local Software Application".
U.S. Appl. No. 10/731,899, filed Dec. 9, 2003, entitled "Mechanism for Downloading Components Associated with XML Documents and Smart Documents".
U.S. Appl. No. 10/366,141, filed Feb. 13, 2003, entitled "Linking Elements of a Document to Corresponding Fields, Queries and/or Procedures in a Database".
U.S. Appl. No. 10/377,258, filed Feb. 28, 2003, entitled "Method and System for Enhancing Paste Functionality of a Computer Software Application".
U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".
U.S. Appl. No. 10/780,376, filed Feb. 17, 2004, entitled "Methods and Systems for Providing Automatic Actions on Recognized Text Strings in a Computer-Generated Document".
U.S. Appl. No. 10/184,190, filed Jun. 27, 2002, entitled "System and Method for Providing Namespace Related Information".
U.S. Appl. No. 10/183,317, filed Jun. 25, 2002, entitled "System and Method for Issuing a Message to a Program".
U.S. Official Action dated Dec. 29, 2003 in U.S. Appl. No. 09/588,411.
U.S. Official Action dated Feb. 12, 2004 in U.S. Appl. No. 10/154,630.
U.S. Official Action dated Mar. 29, 2004 in U.S. Appl. No. 09/906,552.
U.S. Official Action dated Jun. 14, 2004 in U.S. Appl. No. 09/588,411.
U.S. Official Action dated Jun. 18, 2004 in U.S. Appl. No. 09/818,157.
U.S. Official Action dated Jul. 15, 2004 in U.S. Appl. No. 09/906,467.
U.S. Official Action dated Aug. 20, 2004 in U.S. Appl. No. 09/841,266.
U.S. Official Action dated Oct. 6, 2004 in U.S. Appl. No. 09/818,157.
U.S. Official Action dated Nov. 2, 2004 in U.S. Appl. No. 10/178,680.
U.S. Official Action dated Dec. 8, 2004 in U.S. Appl. No. 09/588,411.
U.S. Official Action dated Jan. 25, 2005 in U.S. Appl. No. 09/906,552.
U.S. Official Action dated Jan. 26, 2005 in U.S. Appl. No. 10/154,630.
U.S. Official Action dated Mar. 1, 2005 in U.S. Appl. No. 09/818,157.
U.S. Official Action dated Mar. 17, 2005 in U.S. Appl. No. 09/841,265.
U.S. Official Action dated Mar. 24, 2005 in U.S. Appl. No. 10/141,712.
U.S. Official Action dated Apr. 8, 2005 in U.S. Appl. No. 10/164,960.
U.S. Official Action dated Apr. 19, 2005 in U.S. Appl. No. 09/841,266.
U.S. Official Action dated May 5, 2005 in U.S. Appl. No. 09/906,467.
U.S. Official Action dated May 20, 2005 in U.S. Appl. No. 10/184,298.
U.S. Official Action dated Jun. 3, 2005 in U.S. Appl. No. 10/154,630.
U.S. Official Action dated Jun. 6, 2005 in U.S. Appl. No. 10/164,260.
U.S. Official Action dated Jun. 24, 2005 in U.S. Appl. No. 10/140,544.
U.S. Official Action dated Jul. 25, 2005 in U.S. Appl. No. 10/179,438.
U.S. Official Action dated Sep. 2, 2005 in U.S. Appl. No. 10/366,141.
U.S. Official Action dated Oct. 4, 2005 in U.S. Appl. No. 10/183,317.
U.S. Official Action dated Oct. 5, 2005 in U.S. Appl. No. 10/179,810.
U.S. Official Action dated Oct. 20, 2005 in U.S. Appl. No. 09/906,552.
U.S. Official Action dated Nov. 2, 2005 in U.S. Appl. No. 10/184,190.
U.S. Official Action dated Nov. 10, 2005 in U.S. Appl. No. 10/164,260.
U.S. Official Action dated Nov. 15, 2005 in U.S. Appl. No. 09/841,265.
U.S. Official Action dated Nov. 22, 2005 in U.S. Appl. No. 10/141,712.
U.S. Official Action dated Dec. 14, 2005 in U.S. Appl. No. 10/608,267.
U.S. Official Action dated Dec. 15, 2005 in U.S. Appl. No. 10/155,680.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 2, 2006 in U.S. Appl. No. 09/906,467.
U.S. Official Action dated Feb. 16, 2006 in U.S Appl. No. 10/184,298.
Harold, E.R., "XML: Extensible Markup Language", IDG Books Worldwide, Books 24x7.com printout, 1998, 20 pp.
Marais, Hannes, "Supporting Cooperative and Personal Surfing With a Desktop Assistant", 1997, ACM Press, pp. 129-138.
U.S. Appl. No. 11/396,937, filed Apr. 3, 2006, entitled "Automatically Adding Proper Names to a Database".
U.S. Official Action dated Feb. 24, 2006 in U.S. Appl. No. 10/154,630.
U.S. Official Action dated Apr. 5, 2006 in U.S. Appl. No. 10/377,258.
U.S. Official Action dated Apr. 10, 2006 in U.S. Appl. No. 10/179,810
U.S. Official Action dated Apr. 17, 2006 in U.S. Appl. No. 10/179,438.
U.S. Final Official Action dated Apr. 17, 2006 in U.S. Appl. No. 10/184,190.
U.S. Final Official Action dated Jul. 19, 2006 in U.S. Appl. No. 09/906,552.
U.S. Official Action dated Aug. 2, 2006 in U.S. Appl. No. 10/731,899.
Russian Official Action dated Jan. 11, 2008 cited in Russian Application No. 2004105880/09(006292).
V. Doroth et al., "Modern Computer Vocabulary, " St. Petersburg, BHV-Peterburg, 2001, pp. 465 (with English language translation).
U.S. Official Action mailed Apr. 29, 2008 cited in U.S. Appl. No. 09/588,411.
U.S. Final Official Action mailed Apr. 29, 2008 cited in U.S. Appl. No. 10/179,810.
U.S. Official Action mailed May 1, 2008 cited in U.S. Appl. No. 10/183,317.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
"The Spatial Smart Tag", Geomatic Technologies, Mar. 10, 2005, 2 pp.
Harmon, D., "Microsoft MapPoint 2002", Geoworld Quick-Take Reviews, Aug. 2001, 3 pp.
Irie R. et al., "Resources for Place Name Analysis", May 28, 2004, 4 pp.
Rajabifard, A. et al., "Creating an Enabling Platform for the Delivery of Spatial Information", Spatial Sciences Institute Biennial Conference, Sep. 12, 2005, 10 pp.

Camarda, B., Special Editing Using® Microsoft® Office Word 2003, Que, Dec. 12, 2003, pp. 1-5.
Ivens, K., Office XP Smart Tags, Microsoft, Mar. 6, 2002, pp. 1-4.
Frye, C., Microsoft Office Systems: Step by Step, Microsoft Press, 2003 Edition, Sep. 3, 2003, pp. 1-6.
U.S. Official Action mailed Sep. 8, 2006 in U.S. Appl. No. 10/948,948.
U.S. Official Action mailed Feb. 15, 2007 in U.S. Appl. No. 10/948,948.
U.S. Official Action mailed Oct. 18, 2007 in U.S. Appl. No. 10/948,948.
U.S. Official Action mailed Mar. 20, 2008 in U.S. Appl. No. 10/948,948.
U.S. Official Action mailed Oct. 16, 2008 in U.S. Appl. No. 10/948,948.
U.S. Official Action mailed Oct. 16, 2008 in U.S. Appl. No. 10/154,630.
European Search Report dated Dec. 12, 2006 in European Application No. 05 105 000.3-1527.
European Examination Report dated Oct. 9, 2007 in European Application No. 05 105 000.3-1527.
European Preliminary Opinion dated Aug. 27, 2008 cited in European Application No. 04002224.6- 1527 / 447754.
Chinese Official Action dated Dec. 7, 2007 in Chinese Application No. 200510088529.4.
Chinese Second Official Action dated Aug. 15, 2008 in Chinese Application No. 200510088529.4.
Chilean Second Office Action cited in Chilean Application No. 67/2005, date unknown.
Malaysian Official Action dated Aug. 29, 2008 cited in Malaysian Application No. PI 20031902.
Polish Official Action dated Aug. 27, 2008 in Polish Application No. P360520.
U.S. Official Action dated May 14, 2007 cited in U.S. Appl. No. 09/906,552.
U.S. Final Official Action dated May 18, 2007 cited in U.S. Appl. No. 10/155,680.
U.S. Official Action dated May 30, 2007 cited in U.S. Appl. No. 09/906,467.
U.S. Final Official Action dated Jun. 15, 2007 cited in U.S. Appl. No. 10/731,899.
Blaheta et al., "Assigning Function Tags to Parsed Text," Morgan Kaufmann Publishers Inc., 2000, pp. 234-240.
U.S. Office Action dated Jun. 28, 2007 cited in U.S. Appl. No. 09/841,266.
U.S. Final Office Action dated Jul. 12, 2007 cited in U.S. Appl. No. 10/184,298.
U.S. Office Action dated Jul. 13, 2007 cited in U.S. Appl. No. 10/154,630.
U.S. Office Action dated Jul. 20, 2007 cited in U.S. Appl. No. 09/841,265.
U.S. Final Office Action dated Jul. 26, 2007 cited in U.S. Appl. No. 10/164,960.
U.S. Office Action dated Aug. 10, 2007 cited in U.S. Appl. No. 10/179,810.
U.S. Office Action dated Sep. 10, 2007 cited in U.S. Appl. No. 10/179,438.
European Communication Minutes of Oral Proceedings and Decision dated Sep. 15, 2008 in European Application No. 05 000 506.5-1527.
Polish Second Official Action dated Oct. 28, 2008 in Polish Application No. P36553.
Japanese Office Action dated Oct. 10, 2008 cited in Application No. 2004-037158.
Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53.
Chinese Office Action dated Oct. 17, 2008 cited in Application No. 03145242.6.
U.S. Final Office Action dated Dec. 8, 2008 cited in Appl. No. 10/183,317.
Australian First Official Action dated Oct. 21, 2008 cited in Application No. 2003204800.

U.S. Final Office Action dated Dec. 24, 2008 cited in U.S. Appl. No. 09/841,265.
Sharon Oviatt et al., "Integration and Synchronization of Input Modes during Multimodal Human-Computer Interaction," CHI 97, Atlanta, Georgia, Mar. 22-27, 1997, pp. 415-422.
U.S. Office Action dated Dec. 23, 2008 cited in U.S. Appl. No. 10/179,810.
U.S. Office Action dated Jan. 5, 2009 cited in U.S. Appl. No. 10/141,712.
European Statement regarding Grounds of Appeal dated Jan. 13, 2009 cited in Application No. 04 002 224.6.
Hara, T. et al., "Inside Microsoft.NET-Complete Explanation, 'What Microsoft Aims for'", msdn magazine, No. 6, pp. 20-35, ASCII, Japan, Sep. 18, 2000, 19 pp.
Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese - no translation yet).
(Previously cited) Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).
U.S. Final Office Action dated Jan. 22, 2009 cited in U.S. Appl. No. 10/366,141.
U.S. Office Action dated Feb. 4, 2009 cited in U.S. Appl. No. 10/377,258.
U.S. Final Office Action dated Mar. 4, 2009 cited in U.S. Appl. No. 10/780,376.
European Summons to Attend Oral Proceedings dated Feb. 26, 2009 cited in European Application No. 0301283.0-2211.
European Communication dated Mar. 18, 2009 cited in European Application No. 04003683.2-2211.
European Summons to Attend Oral Proceedings dated Mar. 20, 2009 cited in European Application No. 03012830.0.
Australian First Examiner's Report dated Sep. 15, 2008 cited in Australian Application No. 2003204379.
Japanese Final Official Action dated Nov. 25, 2008 cited in Japanese Application No. 2002-207514.
Japanese Official Action dated Feb. 6, 2009 cited in Japanese Application No. 2003-180218.
Japanese Official Action dated Feb. 13, 2009 cited in Japanese Application No. 2003-162911.
Japanese Official Action dated Feb. 24, 2009 cited in Japanese Application No. 2003-161338.
Japanese Official Action dated Mar. 6, 2009 cited in Japanese Application No. 2004-042140.
Mexican Official Action dated Feb. 11, 2009 cited in Application No. PA/a/2003/005451.
Chinese Final Rejection dated Mar. 13, 2009 cited in Application No. 03145242.6.
Japanese Final Rejection dated Mar. 17, 2090 cited in Application No. 2004-037158.
Japanese Final Rejection dated Apr. 3, 2009 cited in Application No. 2002-207514.
C. Goldfarb, XML Handbook, $1^{st}$ Ed., Pearson Education, Japan, May 10, 1999, pp. 246-254 (no English translation).
S. Tanaka, "Verifying the XML Schema Definition," XML Magazine, Shoeisha Co., Ltd., vol. 10, No. 3, Jul. 1, 2000, pp. 135-155 (no English translation).
U.S. Office Action dated Apr. 20, 2009 cited in U.S. Appl. No. 10/426,446.
U.S. Office Action dated Apr. 27, 2009 cited in U.S. Appl. No. 10/154,630.
Japanese Official Action dated May 26, 2009 cited in Application No. 2005-039754.
Chinese Decision on Rejection dated July 3, 2009 cited in Application No. 03143003.1.
European Summons to Attend Oral Proceedings dated Aug. 5, 2009 cited in Application No. 03003931.7.
Polish Official Notice dated Aug. 25, 2009 cited in Application No. P.365553/DP.
Australian Official Action dated Sep. 11, 2009 cited in Application No. 2003204478.

Norwegian Official Action dated Aug. 24, 2009 cited in Application No. 2003 2550.
Polish Official Notice dated Sep. 22, 2009 cited in Application No. P. 364854/DP.
Polish Official Notice dated Sep. 23, 2009 cited in Application No. P. 360520/DP.
Korean Official Action dated Sep. 30, 2009 cited in Application No. 10-2003-40988.
Japanese Official Notice of Final Rejection dated Oct. 2, 2009 cited in Application No. 2003-162911.
U.S. Office Action dated Oct. 22, 2009 cited in U.S. Appl. No. 10/377,258.
Japanese Official Notice of Final Rejection dated Oct. 27, 2009 cited in Application No. 2003-161338.
Russian Official Action dated Jun. 21, 2009 cited in Application No. 2005104223/09(005505).
D. Richter, "Windows for professionals" (Win32 API programming for Windows NT 3.5 and Windows 95, translation from English, Moscow: Russian Edition, 1995, ISBN 5-7502-0010-8, pp. 26, 31, 215.
U.S. Final Office Action dated Nov. 30, 2009 cited in U.S. Appl. No. 10/179,810.
Glover et al., "Inferring hierarchical Descriptions," ACM, 2002, pp. 507-514.
Australian First Official Action Report dated Jan. 18, 2009 cited in Application No. 2004200459.
Malaysian Examination Report dated Nov. 30, 2009 cited in Application No. PI 20040559.
Australian Third Official Action dated Dec. 23, 2009 cited in Application No. 2003204478.

* cited by examiner

METHOD AND SYSTEM FOR DEFINING SEMANTIC CATEGORIES AND ACTIONS

REFERENCE TO RELATED APPLICATIONS

This is a continuation-in-part of U.S. patent application Ser. No. 09/588,411, entitled "METHOD AND SYSTEM FOR SEMANTICALLY LABELING STRINGS AND PROVIDING ACTIONS BASED ON SEMANTICALLY LABELED STRINGS", filed Jun. 6, 2000, which is incorporated by reference herein.

TECHNICAL FIELD

This invention relates to a method and system for defining semantic categories to recognize in electronic documents and defining actions for those semantic categories.

BACKGROUND OF THE INVENTION

Electronic documents typically include semantic information that would be helpful if the information was recognized as such. Recognition and use of this semantic information could result in increased interoperability between desktop software applications and other desktop applications and/or web-based applications. Recognition of this semantic information may also provide benefits in electronic commerce. Independent third parties should also be able to easily develop list of terms for recognition without the need to create compiled dynamic link libraries (DLLs).

Independent software developers and individual users are often in the best position to determine the semantic information that needs to be recognized in electronic documents. For example, a corporation's IT department knows the format of part numbers, employee numbers, and other semantic information that may be important to individuals in their corporation. Thus, there is a need for a system and method that allows users to define the format of semantic information to be recognized and to provide actions based on the defined semantic information. There is a further need to make this method and system as simple as possible so that the population of developers is increased and so that those who are best able to define semantic information are able to do so.

SUMMARY OF THE INVENTION

The present invention is used in association with a method and system for semantically labeling strings and providing actions for those semantically labeled strings. A string is defined as a data structure composed of a sequence of characters usually representing human-readable text. Strings are recognized and annotated, or labeled, with a semantic category, in particular a type label. After the strings are annotated with a type label, application program modules may use the type label and other metadata to provide users with a choice of actions. If the user's computer does not have any actions associated with that type label, the user may be provided with the option to surf to a download Uniform Resource Locator (URL) and download action plug-ins for that type label.

The present invention, in one embodiment, uses an XML (eXtensible Markup Language) schema to define a list of terms to be recognized as semantic categories. The XML schema in an embodiment of the present invention is also referred to herein as a semantic category list schema. Using an instance of the XML schema, a user may easily define a recognizer to recognize semantic categories without having to compile a complete recognizer plug-in. The XML schema may be written using any editing tool or XML schema editing tool to create an instance of the schema. An instance of the semantic category list schema is also referred to herein as a semantic category list file.

Typically, to prepare the semantic category list file, the user completes all of the properties of the XML schema and specifies the list of terms to recognize directly in the XML schema. In addition to specifying terms directly in the XML schema, the user may use a binary representation of the list of terms because of size constraints. The user may also define actions in the semantic category list file.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
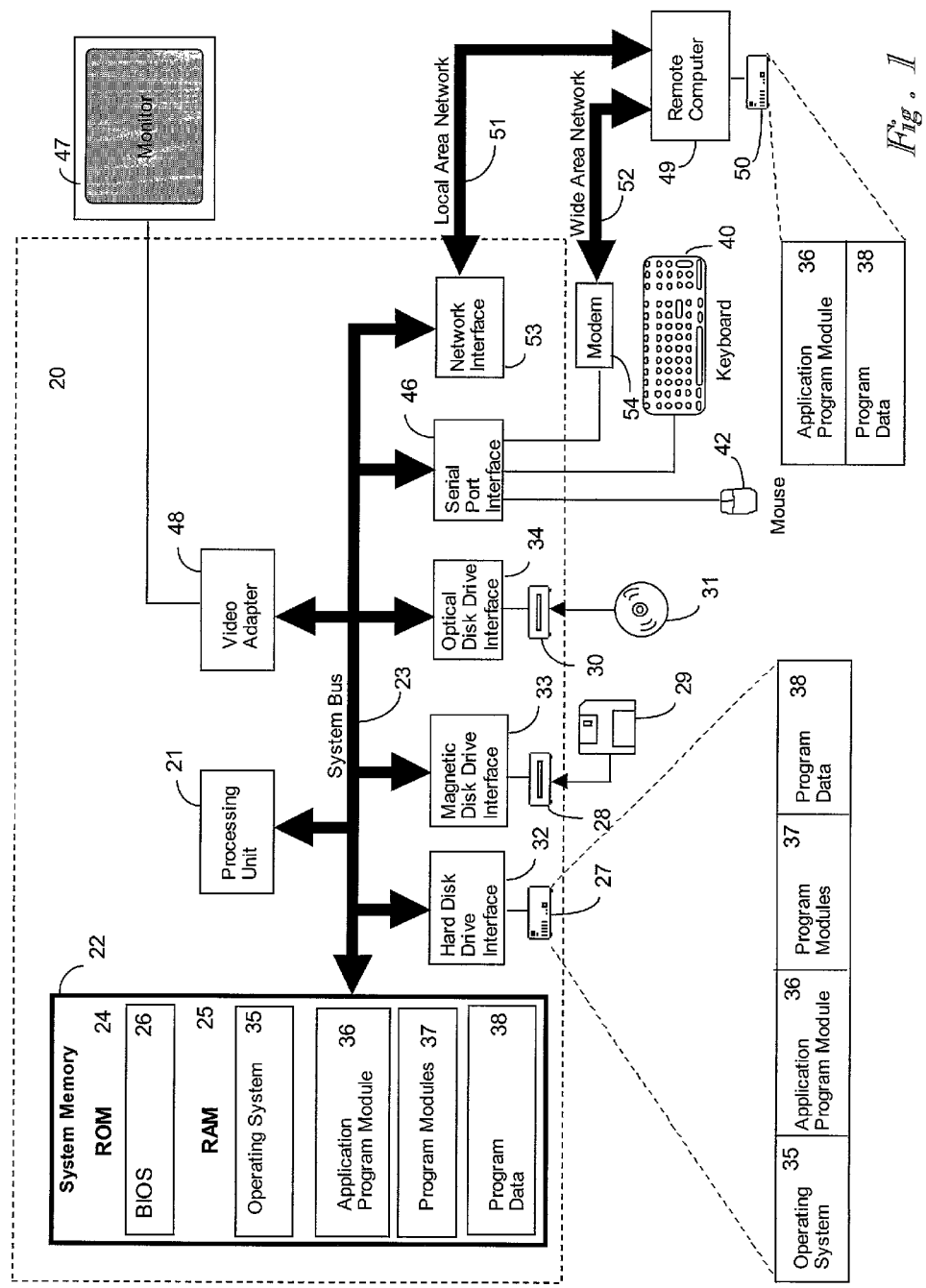
FIG. 1 is a block diagram of a computer that provides the exemplary operating environment for the present invention.

The present invention is used in association with a method and system for semantically labeling strings and providing actions for those semantically labeled strings. A string is defined as a data structure composed of a sequence of characters usually representing human-readable text. Strings are recognized and annotated, or labeled, with a semantic category, in particular a type label. After the strings are annotated with a type label, application program modules may use the type label and other metadata to provide users with a choice of actions. If the user's computer does not have any actions associated with that type label, the user may be provided with the option to surf to a download Uniform Resource Locator (URL) and download action plug-ins for that type label.

The present invention, in one embodiment, uses an XML (eXtensible Markup Language) schema to define a list of terms to be recognized as semantic categories. The XML schema in an embodiment of the present invention is also referred to herein as a semantic category list schema. Using an instance of the XML schema, a user may easily define a recognizer to recognize semantic categories without having to compile a complete recognizer plug-in. The XML schema may be written using any editing tool or XML schema editing tool to create an instance of the schema. An instance of the semantic category list schema is also referred to herein as a semantic category list file.

Typically, to prepare the semantic category list file, the user completes all of the properties of the XML schema and specifies the list of terms to recognize directly in the XML schema. In addition to specifying terms directly in the XML schema, the user may use a binary representation of the list of terms because of size constraints. A binary representation of the list has at least two advantages: the size of the XML schema file is smaller because a Trie structure is used to compress the list of terms and searching the binary file is faster than searching a non-binary file. The user may also define actions in the semantic category list file.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37 (or other type of program module), program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
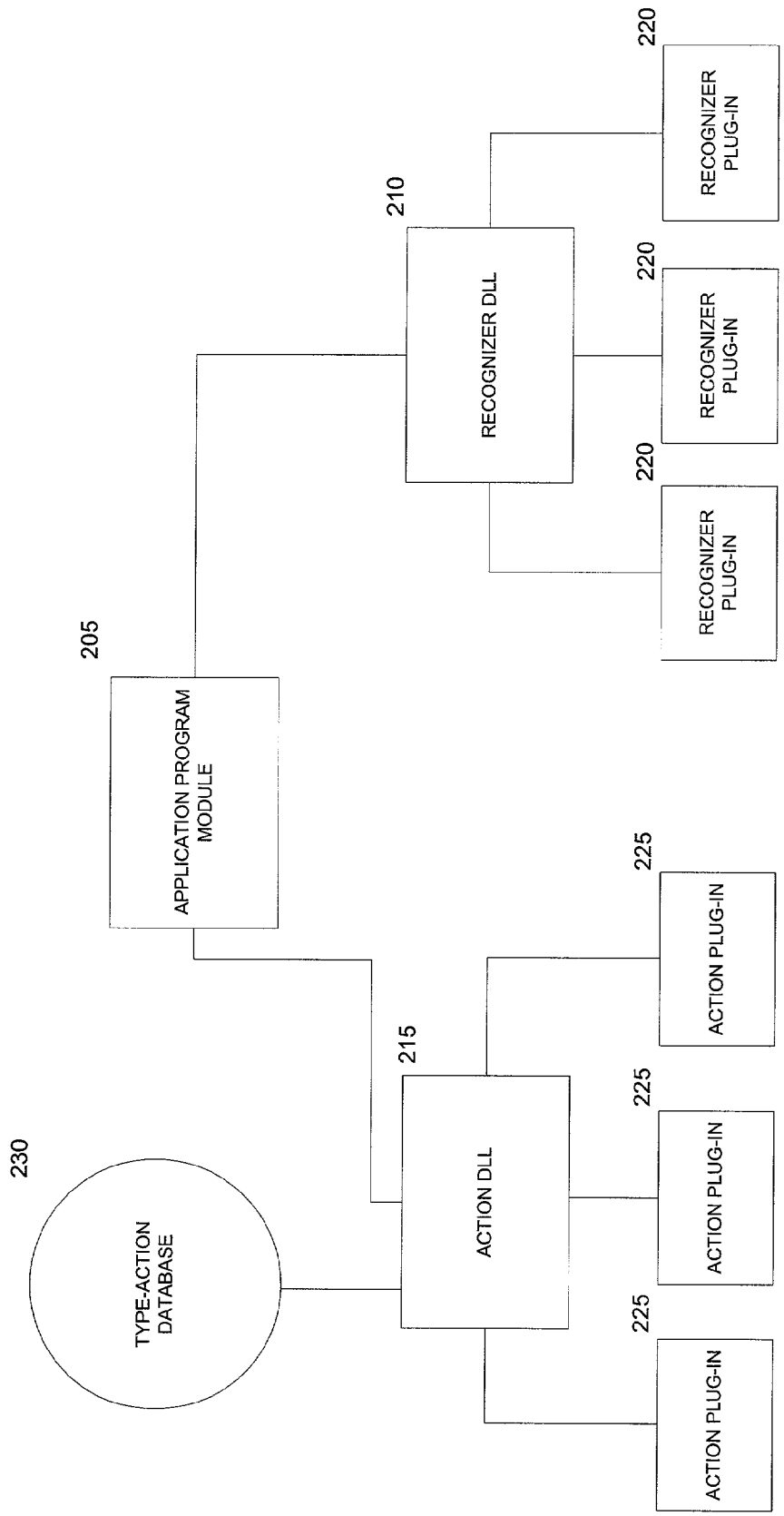
FIG. 2 is a block diagram illustrating an exemplary architecture for use in conjunction with an embodiment of the present invention.

FIG. 2 is a block diagram illustrating an exemplary architecture 200 for use in conjunction with an embodiment of the present invention. The architecture includes an application program module 205, such as word processor program module 37 (FIG. 1). The application program module 205 is able to communicate with a recognizer dynamic-link library 210 (hereinafter recognizer DLL) and an action dynamic-link library 215 (hereinafter action DLL) as a user is creating, editing, viewing, etc. an electronic document. The recognizer DLL 210 controls a number of recognizer plug-ins 220. The action DLL 215 controls a number of action plug-ins 225. The action DLL also controls a type-action database 230.

In a preferred embodiment, the action plug-ins and recognizer plug-ins are Automation Servers. Automation Servers are well-known software components which are assembled into programs or add functionality to existing programs running on the Microsoft WINDOWS® operating system. Automation Servers may be written in a variety of computing languages and may be un-plugged from a program at run time without having to recompile the program. It should also be understood that, in a preferred embodiment, the action DLL and recognizer DLL are merged into a single DLL.

The recognizer DLL 210 handles the distribution of strings from the electronic document running on the application program module 205 to the individual recognizer plug-ins 220. The recognizer plug-ins 220 recognize particular strings in an electronic document, such as a word processing document, a spreadsheet document, a web page, etc.

The recognizer plug-ins 220 may be packaged with the application program module 205 or they may be written by third parties to recognize particular strings that are of interest. Typically, the recognizer DLL 210 passes strings to the recognizer plug-ins 220 in one paragraph or cell value increments.

As part of recognizing certain strings as including semantic information, the recognizer plug-ins 220 determine which strings are to be labeled and how they are to be labeled. After receiving these results from the various recognizer plug-ins 220, the recognizer DLL 210 sends semantic categories to the application program module. In a preferred embodiment, a semantic category comprises the recognized string, a type label, and a download URL. A semantic category may also comprise metadata. The recognizer plug-ins 220 each run separately and the recognizer DLL 210 is responsible for handling the asynchronicity that results from different recognizer plug-ins returning results with different delays.

After a string is labeled by a recognizer plug-in 220 and a semantic category is sent to the application program module 205, the user of the application program module 205 will be able to execute actions that are associated with the type label of the semantic category. The action DLL 215 manages the action plug-ins 225 that are run to execute the actions. As with the recognizer plug-ins 220, the action plug-ins 225 may be packaged with the application program module 205 or written by third parties to perform particular actions that are of interest to the third party. The action plug-ins provide possible actions to be presented to the user based upon the type label associated with the string. The action DLL 215 determines what type label the semantic category includes and cross-references the type label in the type-action database 230 with a list of actions to determine what actions to present to the user. It should be understood that, in a preferred embodiment, the type-action database is not used. Instead, the list of actions is dynamically generated for each type by looking in the registry to determine which actions are installed and then querying the action DLLs to determine which types they apply to.

After the user chooses an action, the action DLL 215 manages the appropriate action plug-ins 225 and passes the necessary information between the action plug-ins and the application program module 205 so that the action plug-in may execute the desired action. Typically, the application program module sends the action DLL an automation request to invoke the action the user has selected.

As described above, the combination of the recognized string, type label, metadata and download URL is referred to herein as a semantic category. The type label is a semantic information label. The semantic category may also comprise metadata, which are hidden properties of the semantic category. An example of a semantic category may clarify the definition. Suppose a user enters the text "Gone With the Wind" into an electronic document. The string "Gone With the Wind" may be identified as a semantic category of type label "Book Title" and of type label "Movie Title". In addition, metadata such as the ISBN number may be returned by the recognizer plug-in to the application program module as part of the semantic category. A download URL may be provided with the type labels "Book Title" and "Movie Title" in case the user's machine has not stored action plug-ins for these type labels. For example, an action for the type label "Book Title" may be "Buy this Book" from an online retailer. If the user does not have the action plug-in DLL 225 corresponding to "Buy this book", then the download URL may be used to navigate the user's web browser to an appropriate website to download this action plug-in. In other implementations of the invention, multiple download URLs may be provided for a single type label.

It should also be understood that the present invention, in a preferred embodiment, also recognizes sequences of capitalized words that contain function words, and which are likely to be special, but for which there is no type label information. These strings are typically labeled by a grammar checker program module.

The actions provided for a semantic category may utilize both the type label and the text of the recognized string. For example, a word processor program module may use a grammar checker as a recognizer plug-in to label strings that are person names. After a string has been labeled as a person's name, the word processor program module may, through a standard user interface mechanism, allow users to execute pertinent actions, such as looking up the person's name in the contacts folder in a personal information manager program module, sending electronic mail, or searching for the person's name in an HR database.

Having described an exemplary architecture, an exemplary method 300 for semantically labeling strings during document creation will be described below in reference to FIGS. 2 and 3.

Method for Semantically Labeling Strings During Document Creation

Figure 3:
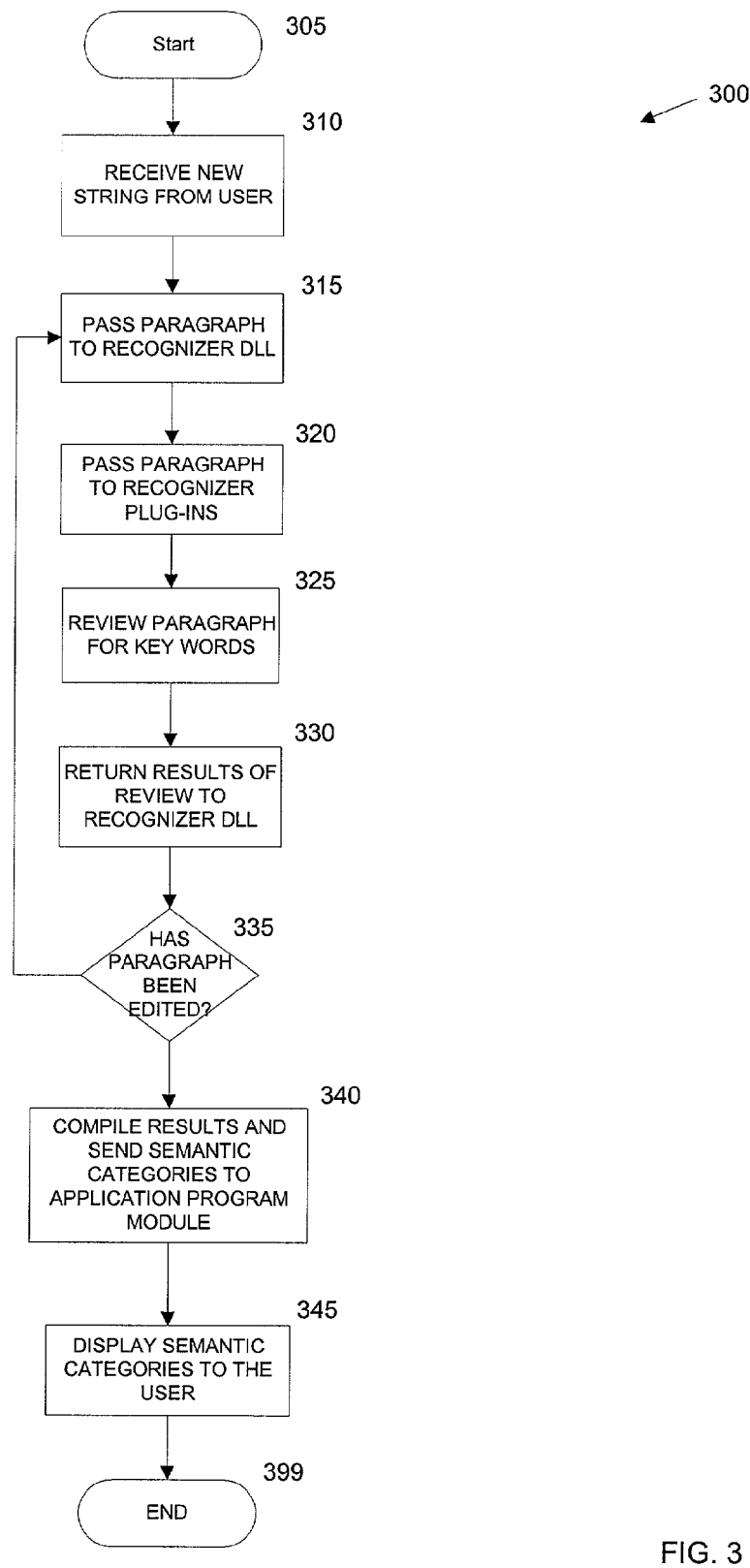
FIG. 3 is a flow chart illustrating a method for semantically labeling strings during creation of an electronic document.

FIG. 3 is a flow chart illustrating a method 300 for semantically labeling strings during creation of an electronic document. Those skilled in the art will appreciate that this is a computer-implemented process that is carried out by the computer in response to input from the user and instructions provided by a program module.

Referring to FIG. 3, the method 300 begins at start step 305 and proceeds to step 310 when a user opens an electronic document in application program module 205. In a preferred embodiment, the electronic document is a word processing document or a spreadsheet document. However, the method is not limited to either of these specific types of electronic documents.

At step 310, the application program module 205 receives a new string, such as when the user enters a new paragraph into the electronic document or edits a previously entered paragraph. The method 300 then proceeds to step 315.

At step 315, the paragraph containing the new string is passed from the application program module 205 to the recognizer DLL 210. The recognizer DLL is responsible for communicating with the application program module, managing the jobs that need to be performed by the recognizer plug-ins, receiving results from the recognizer plug-ins and sending semantic category information to the application program module. At boot time, the recognizer DLL communicates with its recognizer plug-ins to determine what languages it supports, what types it can apply, etc. It should be understood that, in a preferred embodiment, a paragraph is passed to the recognizer DLL at step 315. However, in alternative embodiments, a sentence, the contents of a spreadsheet cell, a section of the document, the entire document, etc. may be passed to the recognizer DLL. In other words, the present invention is not limited to simply passing a paragraph to the recognizer DLL. The method 300 then proceeds to step 320.

Still referring to step 315, the application program module 205 typically sends one paragraph at a time to the recognizer DLL. In addition, in a preferred embodiment, a grammar checker program module sends all semantic categories (without type labels) to the recognizer DLL that have been identified by the grammar checker program module. Passing these semantic categories (without type labels) to the recognizer DLL is important because doing so saves each recognizer plug-in from needing to decide whether something is a capitalized string interspersed with function words (a task that would require writing a number of regular expressions: Cap Cap Unc Cap; Cap Unc Cap; etc.). If a label is applied by a recognizer plug-in to a string the grammar checker program module labeled, the grammar checker label will then be removed.

At step 320, during idle time, the paragraph (and information from the grammar checker program module) is passed to the recognizer plug-ins. The method then proceeds to step 325.

It should be understood that, in a preferred embodiment, the recognizer DLL 210 maintains a job queue. If before the recognizer DLL 210 sends the paragraph to the recognizer plug-ins 220 the user edits the paragraph, then the job containing the edited paragraph is deleted and is not sent to the recognizer plug-ins. Then, a new job enters the queue at step 315 after the edited paragraph is received at step 310. This job deletion is necessary to prevent the recognizer plug-ins from performing unnecessary work on a paragraph that has been edited.

At step 325, the recognizer plug-ins are executed on the paragraph to recognize keywords or perform other actions defined by the recognizer plug-in. As part of executing the recognizer plug-in, the paragraph may be broken into sentences by the recognizer plug-in. However, each recognizer plug-in is responsible for its own sentence-breaking. After the keywords are found at step 325, then the method proceeds to step 330.

At step 330, the results from each of the recognizer plug-ins are received by the recognizer DLL. The method then proceeds to decision step 335.

At decision step 335, it is determined whether the paragraph that has been reviewed by the recognizer plug-ins has been edited after the paragraph was sent to the recognizer DLL. If so, then the method 300 returns to step 315 and the edited paragraph is received by the recognizer DLL from the application program module. If not, then the method proceeds to step 340.

At step 340, the results from the recognizer plug-ins are compiled into semantic categories by the recognizer DLL and the semantic categories are sent to the application program module. At step 345, the application program module displays the semantic categories to the user in the electronic document. The method 300 then ends at step 399.

As should be understood from the above description, the architecture for recognizing semantic categories permits third parties to develop recognizer plug-ins to identify strings of one or more particular types. The recognizer plug-ins communicate with the application program module and receive a string from the application program module. The recognizer plug-ins may apply recognition algorithms to the string and communicate the identity of recognized strings back to the application program module.

After a string is labeled with a particular type label, the user will be able to execute action plug-ins pertaining to that type label. The action plug-ins preferably are COM objects that are executed via communication between the application program module and the action DLL. Parameters necessary to execute the action (the HTML of the string labeled as being of a particular type, the HTML of the string representing the current selection) will be passed from the application program module to the action DLL and, in turn, passed to the action plug-in.

Actions Assigned to Type Labels

An architecture for identifying and executing a set of actions associated with a semantic category may also be provided. This architecture comprises actions that apply to a particular type label (e.g. an action for book titles may be "Buy this book from shop.Microsoft.com") and executing those actions when the user so desires. An action is a user-initiated function applied to a typed string. For example, adding a name to the contacts folder is one action possible for a type label "Person name".

There is power and flexibility that results from allowing third party vendors, such as IT professionals, to design and write recognizer plug-ins and action plug-ins for deployment within an organization or for deployment on the World Wide Web. Some example actions that may be executed include:

Schedule a meeting
Create task
Display calendar
Add to contacts folder
Look up in contacts folder, address book, Windows Address Book (WAB), Global
Address List (GAL), etc.
Insert address into document
Send mail to
Display EXPEDIA map
Stock quote lookup
Send instant message to Different actions may be assigned to different type labels and these type label-action assignments may be stored in the type-action database 230. Table 1 below illustrates some possible type label-action pairings.

TABLE 1

| Type Labels | Actions |
| --- | --- |
| Person name | Show contact info |
|  | Add to contacts |
|  | E-mail |
|  | Insert address into document |
|  | Send instant message to |
| Date | Show calendar for that day |
|  | New task with that due date |
|  | Schedule meeting that day |
| Place | Display EXPEDIA map |
|  | Add to contacts |
| Address | Add to contacts |
| Phone number | Add to contacts |
| E-mail | Add to contacts |
| Date | Schedule a meeting |
| Task | Schedule a task |
| Meeting | Schedule a meeting |

For each type label, the type-action database 230 may store a download URL specified by the creator of the type label that users who do not have action-plug-ins or recognizer plug-ins for that semantic category type can go to in order to get action plug-ins and/or recognizer plug-ins. For example, the download URL for the type label "Book Title" might be microsoft-.com/semanticcategories.asp. Once at that web page, a user may be offered downloads of various action plug-ins and recognizer plug-ins. There may also be an option on the user interface to navigate to the download URL so that recipients of documents with semantic categories can easily get the action plug-ins for those semantic categories.

Storing Semantic Categories

Semantic categories may be stored as part of the electronic document along with other document information and may be available when a document is transmitted from one computer to another computer. In a preferred embodiment, storing semantic categories in an electronic document is controlled by an "Embed semantic categories" checkbox. The checkbox is on by default. Turning it off will prevent semantic categories in the document from being saved. The state of the checkbox is per document. The same checkbox controls saving for both .htm and .doc documents.

Checking a "Save semantic categories as XML properties" checkbox (off by default) will write out the text of all of the semantic categories in the document and their labels in the header of the HTML file in XML (that is using the same tags as are used inline, but surrounded by <xml> And </xml>) for easy identification and parsing by search engines and knowledge management systems.

Semantic categories may be saved as a unique namespace plus a tag name. A namespace is an XML construct for uniquely identifying a group of XML tags that belong to a logical category. Thus, every semantic category is uniquely identified by its nametag (e.g., "streetname") in addition to its namespace (e.g., "schemas-microsoft-com:outlook:contact").

Although the method 300 described above is one method for identifying semantic categories, there may be other mechanisms for identifying semantic categories. One mechanism is a grammar checker program module (not shown) connected to word processor program module 37. Another mechanism is receiving a semantic category from another electronic document. For example, when text containing a semantic category is copied from one electronic document and pasted into another electronic document of the word processor program module 37, the information identifying the semantic category is preserved and copied along with the copied text.

Displaying Semantic Categories to the User

Figure 4:
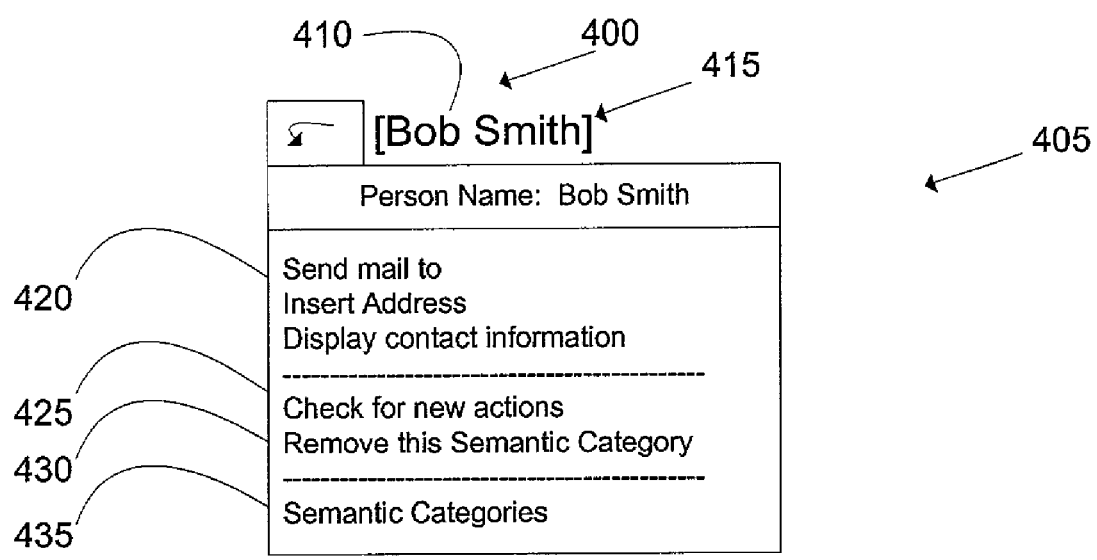
FIG. 4 is an illustration of a display of a semantic category and its associated dropdown menu.

Referring now to FIG. 4, an illustration of a display of a semantic category 400 and its associated dropdown menu 405 will be described. It should be understood that FIG. 4 is an illustration of a semantic category 400 and dropdown menu 405 as displayed to a user by the application program module 205.

The string 410 associated with semantic category 400 is the string "Bob Smith". As shown in FIG. 4, the string 410 of a semantic category 400 may be identified to the user by brackets 415. Of course, many other devices such as coloring, underlining, icons, etc. may be used to indicate to the user that a particular string is a semantic category.

In a preferred embodiment, when the user hovers a cursor over the string 410 or places the insertion point within string 410, then dropdown menu 405 is displayed to the user. The dropdown menu may display a list of actions associated with a semantic category. The dropdown menu may appear above and to the left of the semantic category string.

Typically, the first line of the dropdown menu indicates which string is the semantic category string (Bob Smith in FIG. 4) and what type the semantic category is (Person name in FIG. 4). Listed below the first line are actions 420 available for the semantic category type, such as "Send mail to . . . ", "Insert Address", and "Display contact information . . . ".

The first item on the drop down menu below the separator line is "Check for new actions . . . " 425. "Check for new actions . . . " 425 will appear only for semantic categories whose download URL is available to the application program module. If selected, "Check for new actions . . . " 425 uses the semantic category download URL to navigate the user's web browser to the homepage for the semantic category type applied to the string. For example, suppose new actions have been defined for the semantic category type "person name". If so, then new actions will be downloaded to the user's computer after selecting "Check for new actions . . . " 425. "Check for new actions . . . " 425 will be grayed out if a download URL is unavailable for the semantic category.

If selected, the "Remove this semantic category" item 430 deletes the semantic category label from the string. If selected, the "Semantic categories" item 435 navigates the user to the semantic categories tab of the autocorrect dialog.

It should be understood that the application program module sends a request to the action DLL to determine which actions are shown with each semantic category type.

Actions Performed in Association with Semantic Categories

There are a number of functions that users perform on typed data that preferred word processor program module 37 and semantic categories will make easier. The functions fall into three primary categories:

1) interacting with personal information manager contacts, tasks, meetings, and mail;
2) interacting with properties on the World Wide Web or a corporate intranet; and
3) interacting with other applications on the client machine.

A single string may be associated with multiple semantic categories. Every semantic category has a type label with one or more action plug-ins defined for the type label. For example, the "Address" type label may have the "Open in MapPoint", "Find with Expedia Maps" and "Add to my Address Book" actions associated with it and each of these actions may have a different action plug-in to execute the action.

The actions assigned to type labels also depend on the computer that the application program module is running on. Thus, if a computer has three actions registered for the type label "Address", then all strings with an "Address" type label will be assigned to three actions. However, if one of these semantic categories is sent to a computer which has only two actions registered for the "Address" type label, then the user will only be exposed to two actions for this semantic category.

Nesting of Semantic Categories

In an embodiment of the present invention, semantic categories may be nested inside each other. For example, the string "George Washington" may include a semantic category with type label "Person Name" for the span "George Washington State" and a semantic category with type label "State" for the span "Washington". Moreover, two semantic categories may cover exactly the same span. For example, the string "George Washington" may include a semantic category with type label "Person Name" and a semantic category with type label "President".

Because the preferred application program module 37 will support labeling a single string with multiple type labels (e.g. Bob Smith could be a semantic category labeled as a "Person Name" and labeled as a "Microsoft employee"), the preferred application program module 37 will use cascade menus on the dropdown menu if multiple semantic category types are assigned.

For example, the cascade menu may include a list of the type labels included in the recognized string. This list may include a type label "Person Name" and a type label "Microsoft employee".

It should be understood that a cascade menu may be used to allow the user to select which type label the user is interested in and to further select an action after selecting the type label.

In-document User Interface to Indicate Semantic Categories

As described above with reference to FIG. 4, the application program module may include the option to display an in-document user interface to indicate the location of semantic categories. This in-document user interface may use a colored indication to indicate the location of a semantic category, such as the brackets 415 in FIG. 4. The in-document user interface will also be able to show nesting of semantic categories. For example, if Michael Jordan is labeled as a semantic category with type label "Person Name", Michael is a semantic category with type label "First Name" and Jordan is a semantic category with type label "Last Name", the document may look like this with the brackets indicating semantic categories:

[[Michael][Jordan]]

Of course, the in-document user interface may be any sort of indication. For example, in the "EXCEL" spreadsheet application program, the interface comprises a triangle in the lower right hand portion of a cell to indicate that one or more semantic categories are present in the cell.

Although the present invention has been described as implemented in a word processing program module, it should be understood that the present invention may be implemented in other program modules, including, but not limited to, HTML authoring programs and programs such as the "POWERPOINT"® presentation graphics program and the "OFFICE" program module, both marketed by Microsoft Corporation of Redmond, Wash.

As described above, the semantic category may also include metadata returned by the recognizer plug-ins. For example, a recognizer plug-in that recognizes the titles of books may return as metadata an ISDN book number when it recognizes the title of a book. The ISDN book number metadata may then be used to provide actions. Metadata may also be used to disambiguate for actions and searches. For example, suppose a recognizer DLL is linked to a corporate employee database to recognize names. When the recognizer DLL recognizes "Bob Smith", it may store "employeeID=12345" as metadata in the background. Then, when an action is fired, the text in question will be known to reference Bob Smith, employee no. 12345 rather than Bob Smith, employee no. 45678. Also, the metadata may allow searches to be performed independent of the actual text in a document. So, a search may be conducted on "Robert Smith" by looking for employee 12345 in the employee databases and by performing a search on the metadata for employee number 12345 to find documents with "Bob Smith" in them. There are also numerous other functions for metadata. For instance, DHTML could be inserted so special tricks may be performed within a web browser. Additionally, data used by other actions may be inserted such as someone's e-mail address that could be used by the send-mail-to action, a normalized version of the date could be stored to easily interact with a personal information manager, etc.

Defining a List of Terms to be Recognized

The present invention, in one embodiment, uses an XML (eXtensible Markup Language) schema to define a list of terms to be recognized as semantic categories. The XML schema in an embodiment of the present invention is also referred to herein as a semantic category list schema. Using an instance of the XML schema, a user may easily define terms to be recognized as semantic categories without having to compile a complete recognizer plug-in. The XML schema may be written using any editing tool or XML schema editing tool to create an instance of the schema. An instance of the semantic category list schema is also referred to herein as a semantic category list file.

Typically, in preparing the semantic category list file, the user completes all of the properties of the XML schema and specifies the list of terms to recognize directly in the XML schema. In addition to specifying terms directly in the XML schema, the user may use a binary representation of the list of terms because of size constraints. A binary representation of the list has at least two advantages: the size of the XML schema file is smaller because a Trie structure is used to compress the list of terms and searching the binary file is faster than searching a non-binary file. The user may also define actions in the semantic category list file.

Semantic Category List File

In one embodiment of the present invention, each semantic category list file adheres to a semantic category list schema. The schema specifies the XML tag names allowed or required in the list file and their syntax. The semantic category list file in Table 2 below is for a fictitious company called "A.Datum Corporation". The list file comprises "medical condition" terms to be recognized. Note that the "FL" in the list file of Table 2 is used to map the semantic categories to an XML namespace declaration at the top of the semantic category list file. In one embodiment of the invention, "FL" is required and must map to the appropriate namespace for semantic categories, such as "urn:schemas-microsoft-com:smarttags:list".

TABLE 2

```
<FL:smarttaglist xmlns:FL="urn:schemas-microsoft-com:smarttags.list">
<FL:name>Medical Condition Terms</FL:name>
<FL:lcid>1033</FL:lcid>
<FL:description>A list of medical conditions for recognition, as well
as a set of actions that work with them.</FL:description>
<FL:moreinfourl>http://www.adatum.com/moreinfo</FL:moreinfourl>
<FL:updateable>true</FL:updateable>
<FL:autoupdate>true</FL:autoupdate>
<FL:lastcheckpoint>100</FL:lastcheckpoint>
<FL:lastupdate>0</FL:lastupdate>
<FL:updateurl>http://www.adatum.com/smarttags/listupdate.xml</FL:updateurl>
<FL:updatefrequency>20160</FL:updatefrequency>
<FL:smarttag type="urn:schemas-adatum-com:medical#condition">
<FL:caption>A. Datum Corporation</FL:caption>
<FL:terms>
```

TABLE 2-continued

```
<FL:termlist>allergy, cough, arthritis, headache, migraine, heartburn,
high blood pressure, digestive disorder, diarrhea, cold, thyrotoxicosis,
thalassemia, bloating, nausea, bronchitis</FL:termlist>
    </FL:terms>
    <FL:actions>
      <FL:action id="CompanyInfo">
      <FL:caption>&A. Datum Corporation Company Reports</FL:caption>
      <FL:url>http://www.adatum.com</FL:url>
      </FL:action>
      <FL:action id="CompanyHomePage">
      <FL:caption>View A. & Datum Website</FL:caption>
    <FL:url>http://www.adatum2.com/home.asp?String={TEXT}</FL:url>
      </FL:action>
    </FL:actions>
  </FL:smarttag>
  </FL:smarttaglist>
```

The elements of the exemplary semantic category list file of Table 2 will be described below.

Semantic Category List Schema

The semantic category list file of Table 2 adheres to a semantic category list schema in accordance with an embodiment of the present invention. The elements of the semantic category list schema are individually described below.

smarttaglist—a schema namespace declaration.

name—a user-friendly name for this semantic category recognizer.

lcid—a comma separated list of "LocaleIDs" or language identifiers of languages in which items in the list will be recognized. If the value of this tag is *, 0 or is not specified, it is assumed that the list works in all locales. Sometimes the host application does not specify the lcid and, in that case, the value is ignored. In some applications, language auto-detection determines what the language is.

description—a longer string that describes this semantic category.

moreinfourl—a URL for more information on this recognizer.

updateable—a Boolean flag that specifies whether this list is updateable. If this element is not specified, it is assumed that the list is not updateable.

autoupdate—a Boolean flag that specifies whether this recognizer should auto-update. If this element is not specified, it is assumed that the list does not auto-update.

lastcheckpoint—an ID specifying the last semantic category list update. It is an integer that serves as the "version number" for the last update. If the server has a higher version number than the lastcheckpoint ID when an auto-update is performed, an update occurs. If the operation is successful, lastcheckpoint is updated to the higher version number.

lastupdate—an integer that specifies the time when the last update occurred. It is a long integer that represents the number of minutes since 1970. Normally, this value is initially set to zero. The lastupdate value is used to determine whether it is time to check for updates. For example, it may be inefficient to check for an update if the last update was obtained one day ago.

updateurl—a URL to check for updates to the list of terms to be recognized. If this element is not specified, the list is not designed to be updateable.

updatefrequency—an integer that specifies in minutes how often a list should be updated. If this element is not specified, assume a default value of 10080 (7 days). updatefrequency is used in conjunction with lastupdate.

smarttag type—a unique namespace, specified as namespaceURI#tagname. The namespaceURI ensures that the smarttag type is globally unique and unambiguous. Two semantic categories with the same tag name can therefore be differentiated using namespaces. For example, two booksellers may use the tagname "Books" as long as they use different namespace URIs.

caption—specifies the title caption for the semantic category to be displayed.

terms—a collection of terms to recognize.

termfile—A link to the binary file that includes terms to be recognized (not shown in Table 2).

termlist—the contents of this element should be a comma-separated list of terms to be recognized.

property—a name and value pair to be attached to the property bag if the term is recognized. The property element allows users to attach metadata to the semantic category. For example, for a semantic category entitled "Books", uniform metadata such as Booktype=fiction may be attached using the property element.

actions—a list of new or revised action identifiers.

action—this element has one attribute called id. id is a required alphanumeric string that uniquely identifies the action that applies to a particular type label.

url—specifies the URL to activate for an action. The URL supports a number of tokens that serve as parameters to the HTTP fire. These tokens are described in further detail below.

caption—an action caption.

One of the more important properties defined in the semantic category list file is the tag name (the tag name is the attribute contained within the "FL:smarttag type" tag). Here, the list provider can specify which tag name they would like to recognize the terms in. This gives list providers the flexibility to define custom semantic categories that they can mix and match with different actions.

Semantic category terms can be defined literally in the semantic category list file within the <FL:termlist> tag. Semantic category terms can also be encoded into a custom binary file format optimized for parsing speed and memory overhead. Binary semantic category terms can be "pointed at" with the <FL:termfile> tag.

For literal semantic category terms, the schema allows list creators to recognize terms in a case insensitive manner (e.g., either "cold" or "ColD" are recognized) or a case sensitive manner (e.g., only "cold" is recognized). In order to recognize terms in a case sensitive manner, the list creator can encapsulate terms within quotes. Terms not encapsulated within quotes are recognized in a case insensitive manner.

In other embodiments, the schema may provide broader support for defining recognition in a semantic category list file. Recognition need not occur via strict lists of terms that are recognized in case sensitive or insensitive fashion. In one embodiment, recognition is specified via context-free grammars (CFGs). CFGs provide a mechanism for specifying a text pattern that items being recognized can match or not match. If text patterns meet a specified CFG, then they are recognized. For example, the recognition might occur via XML plug-ins to a CFG recognition engine.

Semantic Category List Actions

To be useful to the broadest range of end users, semantic categories placed into documents should be associated with some actions. In recognition of this, the invention, in one embodiment, not only makes it easy to specify lists of terms that should be recognized but also makes it easy to supply actions to be associated with those recognized terms.

In one embodiment, the present invention allows a creator to specify multiple actions within the semantic category list file. For example, an action to open a web browser program module and navigate to a particular URL may be specified in the semantic category list file. The semantic category list file may also be used to define an action that is defined in a separate action plug-in.

More specifically, the present invention, in one embodiment, allows users to specify web page navigation actions in a semantic category list file. More than one action can be supplied per semantic category list file by adding more than one <FL:action> tag within the <FL:actions> collection.

In one embodiment, the present invention may replace tokens in the supplied URL with data that is specific to the semantic category being acted upon. In effect, it enables parameterized URLs to be used. The tokens are URL encoded so as to work in most browsers. In one embodiment, the present invention supports the following tokens:

{TEXT}—this token is replaced with the semantic category value. For example, for a stock ticker symbol {TEXT} might be "MSFT";

{TAG}—this token is replaced with the tag name for the semantic category;

{PROP:VALUE}—this token is replaced with meta data from a semantic category property bag. VALUE is the name of a property bag key. So, if the property bag for a semantic category contains a property called "Company" with a value of "Microsoft", the token {PROP:Company} will be replaced with Microsoft or Company=Microsoft, for example; and {LCID}—an integer corresponding to the user's current UI language lcid.

Creating a Semantic Category List File

Figure 5:
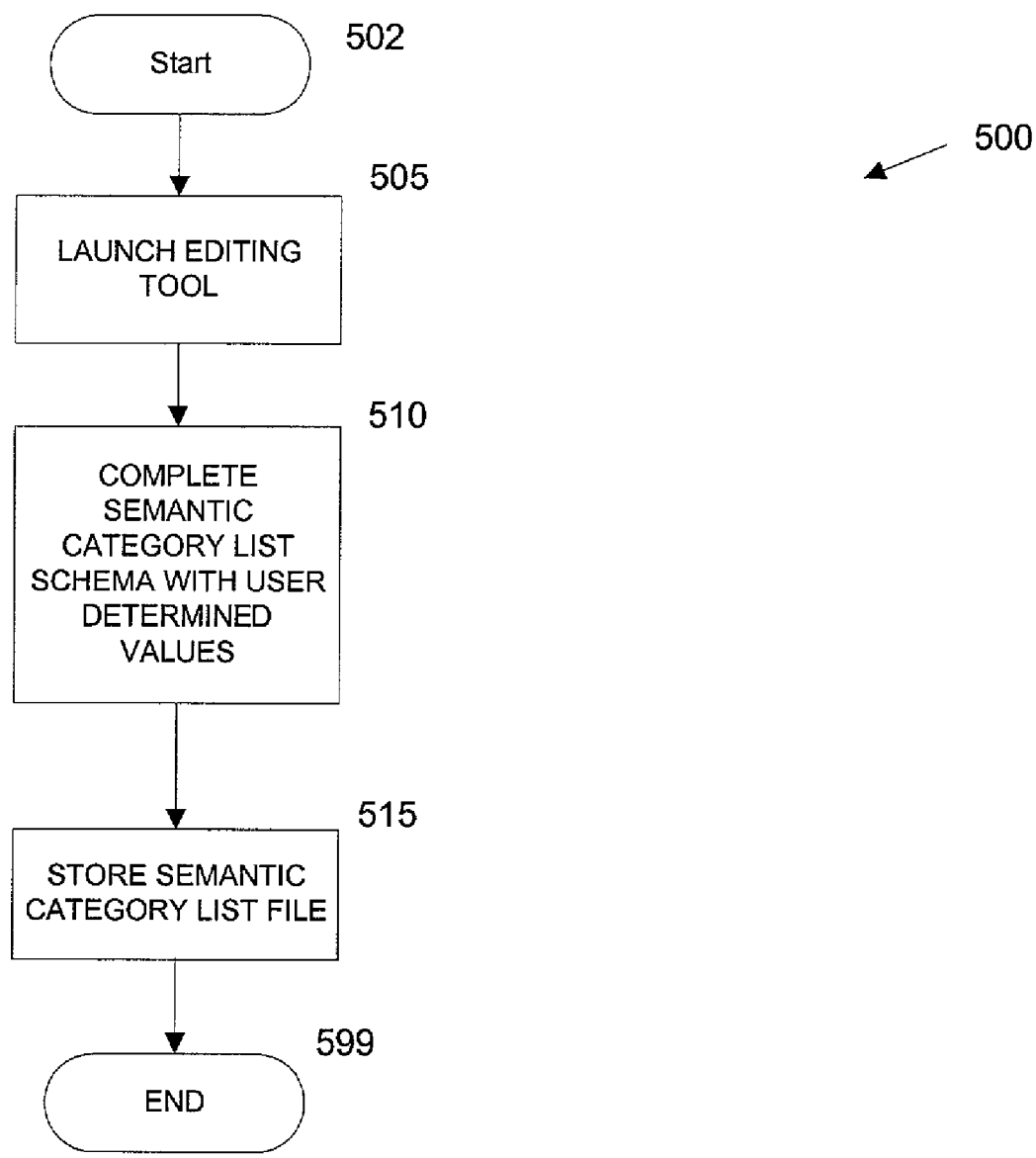
FIG. 5 is a flowchart illustrating a method for creating a semantic category list file in accordance with an embodiment of the present invention.

Referring now to FIG. 5, a method 500 for creating a semantic category list file in accordance with an embodiment of the present invention will be described. At step 505, the user begins by launching an editing tool such as the "NOTE-PAD" tool marketed by Microsoft Corporation of Redmond, Wash. The user may save the file he is working on as a text file which will be the source file (the semantic category list file). The source file can be returned to and updated as necessary. The method then proceeds to step 510.

At step 510, the semantic category list schema is completed using the values for different elements determined by the user to form the semantic category list file. The method then proceeds to step 515.

At step 515, the semantic category list file is stored in a directory. In one embodiment of the invention, the directory is one of a few specific directories which are searched to find semantic category list files. These directories are described below.

Deploying Semantic Category List Files in a Directory

As described above, in one embodiment, the present invention requires a semantic category list file conforming to a specific semantic category list schema in order to implement user-defined recognition of terms and/or actions. In one embodiment, the present invention searches for these semantic category list files by looking for .XML files located in one of three directories on a file system. One directory is located in a per-machine location, another directory is located in a per-user location, and another directory may be defined by the user by writing a registry key that points to a custom location.

Taken together, these directories give the user the flexibility to install semantic category list files that affect just one user or all users on a given machine. The user may use the custom directory functionality to specify a department or corporate file share which contains common semantic category list files.

Updating Semantic Category List Files

Semantic category terms may change over time. Stock ticker symbols, for example, change as companies enter and leave stock exchanges. Thus, if a semantic category list file to recognize stock ticker symbols is created then it will need to be periodically updated. For this reason, in one embodiment, the present invention provides support for communicating with a server that supports Hypertext Transfer Protocol (HTTP) to determine if a new update is necessary.

The server is given an opportunity to define whether a new update exists and when it should be downloaded. It does this by defining an update description file, using an XML schema instance referred to herein as the semantic category list update file. An exemplary semantic category list update file is illustrated in Table 3 below:

TABLE 3

```
<FLUP:smarttaglistupdate xmlns:FLUB="urn:schemas-microsoft-
com:smarttags:listupdate">
    <FLUP:checkpoint>400</FLUP:checkpoint>
    <FLUP:smarttaglistdefinition>foo.xml</FLUP:smarttaglistdefinition>
</FLUP:smarttaglistupdate>
```

The exemplary semantic category list update file of Table 3 indicates that semantic category terms exist on the server with a checkpoint value of 400. It also specifies which list of semantic category terms should be downloaded: either the XML file that represents the list, its binary list representation, or both. In the example of Table 3, the semantic category terms entitled foo.xml are to be downloaded.

Central to the notion of an update is the checkpoint value. The checkpoint value can be considered a version number for the current list definition stored on the server. If the checkpoint is greater than the lastcheckpoint of the currently installed semantic category terms, then the newer files are downloaded via HTTP to replace their existing counterparts. Then, the semantic category terms are updated to match what it received from the server.

To place a semantic category list update file on a server, a file with the "FLUP" (or some other namespace shorthand alias) is placed on the appropriate server. The new semantic category terms may also be stored in the same directory along with the semantic category list update file.

This semantic category list update file is named to match the example pointed to by the updatedurl element in the semantic category list file. For example, referring to Table 2, the semantic category list update file would need to be stored as "listupdate.xml" to match the updateurl element in the semantic category list file.

The semantic category list update file adheres to an XML schema (the semantic category list update schema) as will be described below. The elements in one embodiment of the semantic category list update schema are described below:

smarttaglistupdate—contains the update schema namespace declaration.

checkpoint—this value has to be greater than the lastcheckpoint value for an update to occur. It is also the new version number (lastcheckpoint value) to record in the semantic category list file if any files are updated.

smarttaglistdefinition—points to the new semantic category terms to be downloaded to replace the existing (old) semantic category terms on the client's computer. For every smarttaglistdefinition element supplied by the semantic category list file, corresponding replacement semantic category terms are downloaded.

Figure 6:
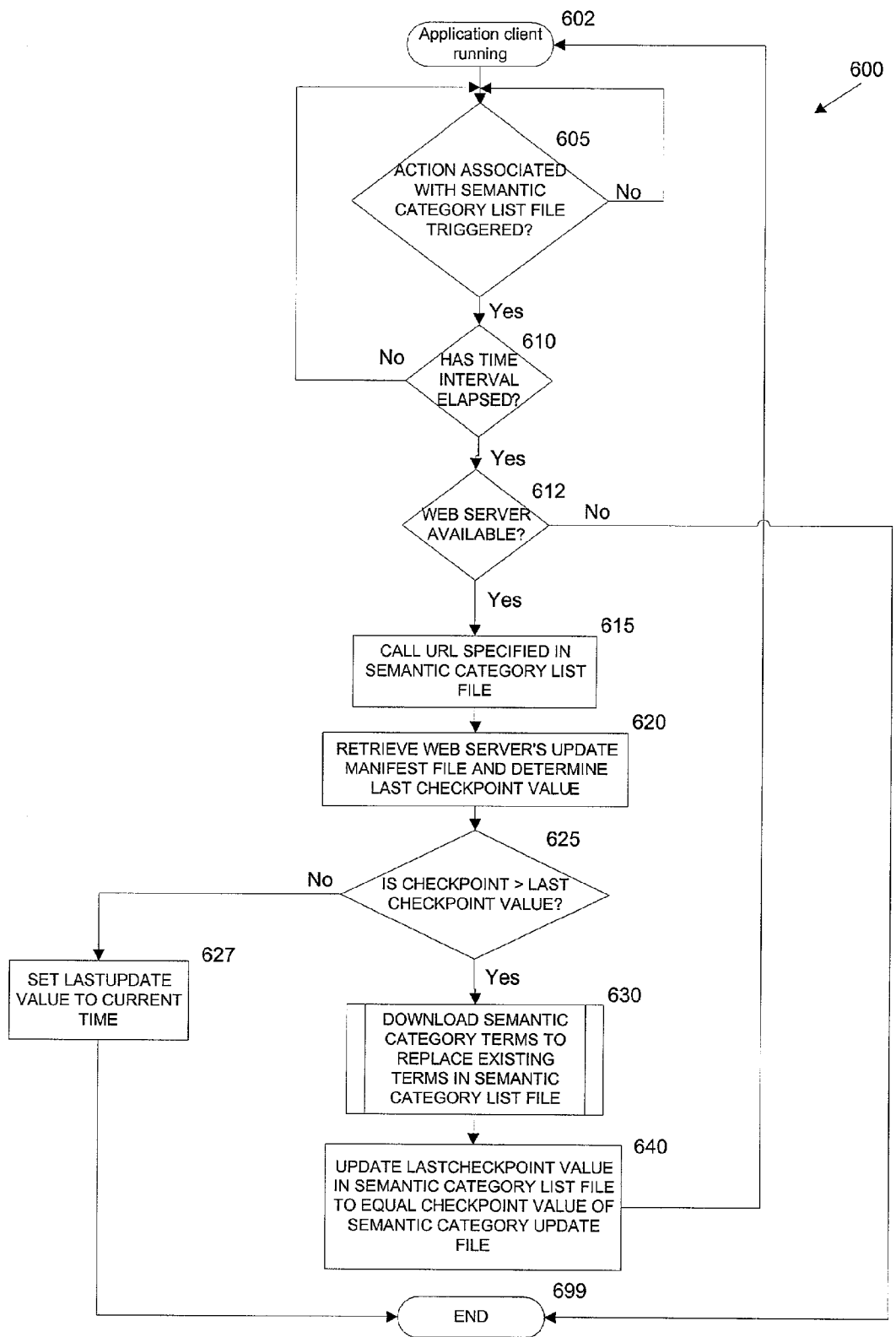
FIG. 6 is a flowchart illustrating a method for performing an update of a semantic category list file with a semantic category list update file in accordance with an embodiment of the present invention.

Referring now to FIG. 6, a method 600 for performing an update of a semantic category list file with a semantic category list update file in accordance with an embodiment of the present invention will be described. At step 602, the method begins as the application program module is booted and begins running.

At decision step 605, it is determined whether the user has initiated an action associated with a semantic category list file. If so, then the method proceeds to decision step 610. Performing an update check when action code of a semantic category list file is called eliminates the need to have a separate background process that periodically checks for updates. Also, in one embodiment, the present invention only checks for updates when actions fire to ensure that updating is performed only for users who use an action. For example, all possible users do not need updates from a web server if only a small minority of users would want to use a particular action functionality. Checking for updates when actions fire ensures that only people who actively use the action incur the overhead of checking for updates. Of course, in other embodiments, updates may be periodically triggered or triggered by the user.

At decision step 610, it is determined whether the interval specified by the updatefrequency element in the semantic category list file on the client's computer has elapsed. If it has, the method proceeds to step 615. If not, the method 600 returns to decision step 605. Typically, at decision step 610, the difference between the current time and the last update value is determined and if the difference is greater than the update frequency, then the method proceeds to decision step 612. However, if the difference is less than the update frequency, then the method returns to decision step 605.

At decision step 612, it is determined whether the web server is available so that the user does not have to wait on the web server. If the web server is available, the method proceeds to step 615. If not, then the method ends at step 699.

At step 615, the URL specified in the semantic category list file in the updateurl element is called. The method then proceeds to step 620.

At step 620, the web server's update manifest file is retrieved and the lastcheckpoint value is determined. The method then proceeds to decision step 625.

At decision step 625, it is determined whether the checkpoint value of the semantic category update file is greater than the lastcheckpoint value of the semantic category list file. If not, then the method proceeds to step 627 where the lastupdate value is set equal to the current time. If the checkpoint value of the semantic category update file is greater than the lastcheckpoint value of the semantic category list file, then the method 600 proceeds to step 630. Otherwise, the method ends at step 699.

At step 630, the semantic category terms from the semantic category update file are downloaded to replace the existing semantic category terms in the semantic category list file. An embodiment for replacing the existing semantic category terms is described in reference to FIG. 7. The method then proceeds to step 640.

At step 640, the lastcheckpoint value in the semantic category list file is updated to be equal to the checkpoint value of the semantic category update file. The lastupdate value of the semantic category list file may also be set to the current time. The method then returns to step 602.

Figure 7:
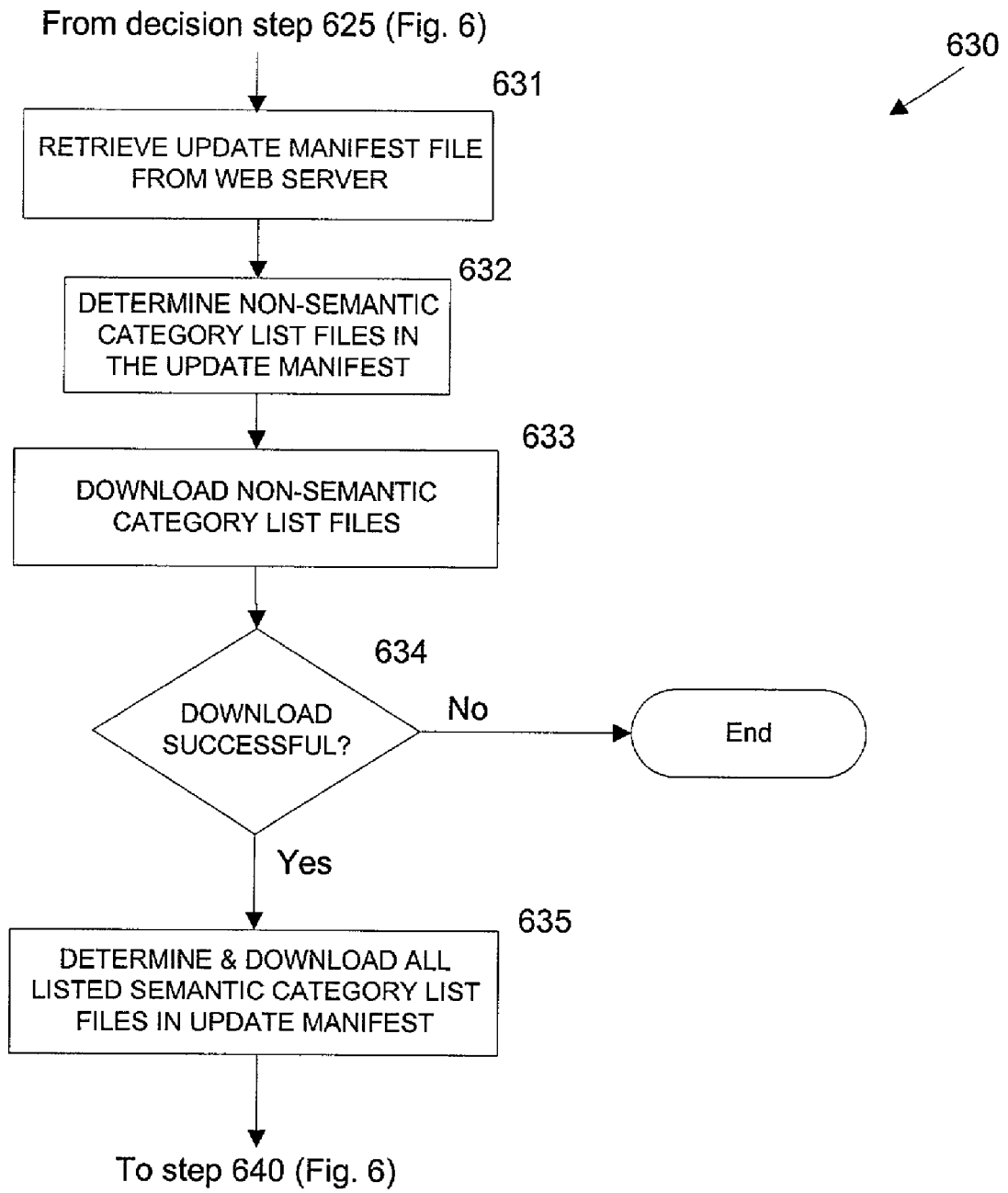
FIG. 7 is a flowchart illustrating a method for downloading semantic category terms in accordance with an embodiment of the present invention.

Referring now to FIG. 7, a flowchart illustrating a method for downloading semantic category terms (step 630 in FIG. 6) in accordance with an embodiment of the present invention will be described.

At step 631, the update manifest file is retrieved from the web server. The method 630 then proceeds to step 632.

At step 632, the non-semantic category list files (i.e. those marked by "<smarttaglistfile>" in the update manifest) are determined. Step 632 is performed first such that these auxiliary files are in place before the semantic category list file(s) are updated (which typically reference these auxiliary files). Also these auxiliary files tend to be larger, so they are slightly more likely to fail in downloading.

At step 633, each <smarttaglistfile> found at step 632 is downloaded into the same directory as the semantic category list file which triggered this update.

At decision step 634, it is determined whether the download was successful. If not, the method ends. If the download was successful, then the method proceeds to step 635.

At step 635, all listed semantic category list files (i.e. those marked by "<smarttaglistdefinition>" in the update manifest) are determined and downloaded.

Although not shown in FIG. 7, at step 640 (FIG. 6) for each file, the lastcheckpoint value is updated to match that in the update manifest.

Semantic Category List Tool

Figure 8:
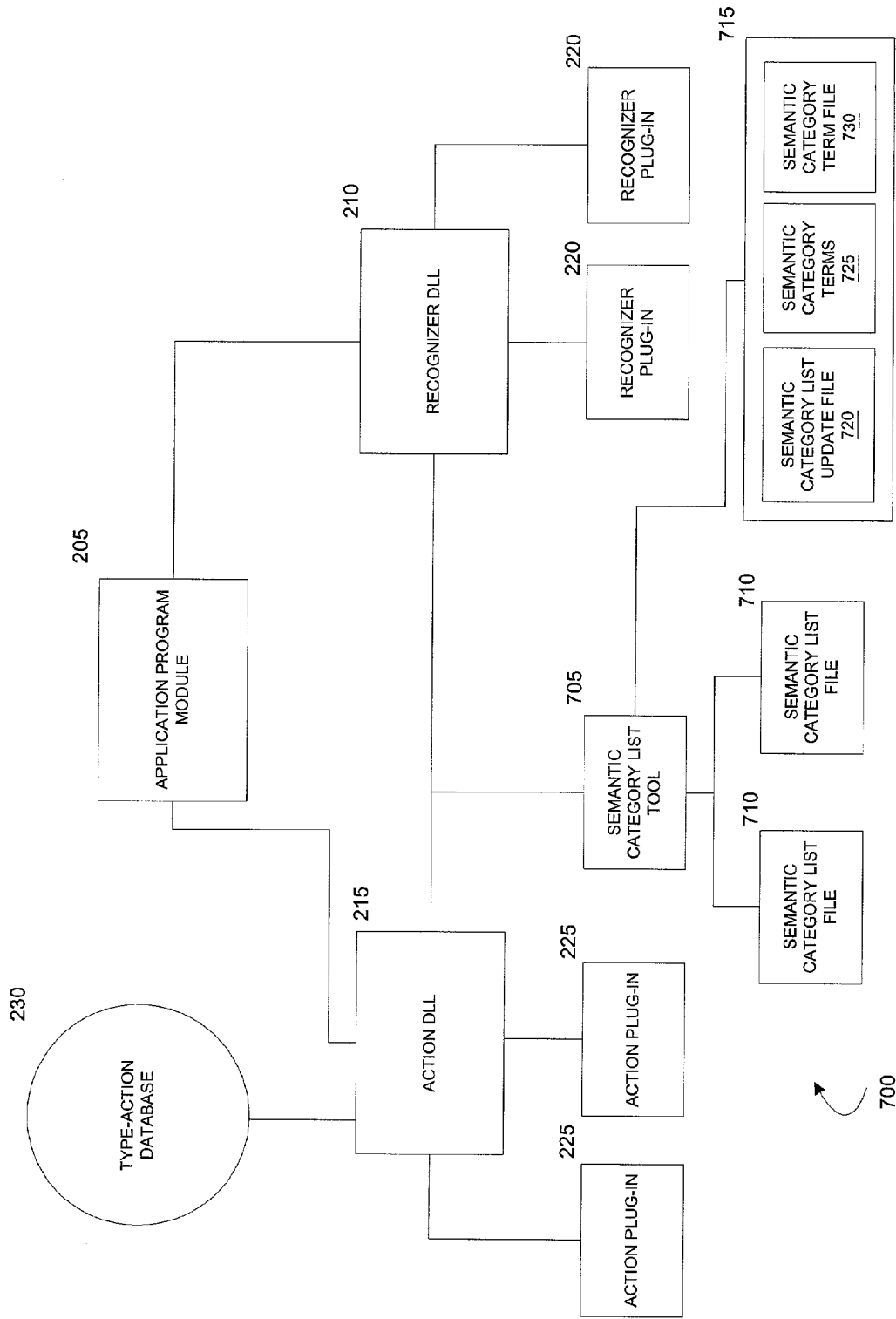
FIG. 8 is a block diagram illustrating an exemplary architecture for use in conjunction with an embodiment of the present invention.

Referring now to FIG. 8, a block diagram illustrating an exemplary architecture 700 for use in conjunction with an embodiment of the present invention will be described. Many of the elements are the same as in FIG. 2 and are indicated by the same numerals. The architecture 700 includes a semantic category list tool 705 connected to the action DLL 215 and recognizer DLL 210. In one embodiment, the semantic category list tool 705 is a wrapper recognizer DLL and action DLL. A wrapper is essentially a class (for example a C++ class) that contains an object to which the class provides an interface. A wrapper class is so called because it encapsulates, or "wraps," the code involved in certain tasks, such as getting and releasing interface pointers and working with strings. In one embodiment of the invention, the semantic category list tool wraps around the ISmartTagRecognizer and ISmartTagAction APIs which implement semantic category recognition and actions so that the single plug-in may be used to implement both recognition and action.

The semantic category list tool 705 provides several services including maintaining lists of terms associated with any number of type labels, acting as a recognizer that works with multiple lists of terms, providing HTTP-based actions that work with any number of type labels, using HTTP-based communications to keep in contact with a web server and update its list of terms and actions, etc.

The semantic category list tool 705 may be used by any individual or organization to maintain their own list of terms and HTTP-based actions for those recognized terms. Users generate semantic category list files 710 and store them in one of a number of predefined directories. The semantic category list tool searches these directories and reads the contents of the semantic category list files. If the list files conform to the semantic category list schema, then the semantic category list tool is able to use these list files to generate the appropriate APIs and populate the fields of the API with the values from the semantic category list file. Thus, the semantic category list tool is able to use the semantic category list files to perform user-defined recognition and actions. The files are parsed and the data specified for each element of the schema is used.

The semantic category list tool 705 is also able to communicate with server 715 to update the semantic category list files 710 using the semantic category list update files 720, the semantic category terms 725, and the semantic category term file 730.

It should be understood from the foregoing description that for use in international settings, the semantic category list file in accordance with an embodiment of the invention may be written in Unicode. This allows any extended character to be specified in the termlist.

It should be understood that in one embodiment of the invention the XML Data Interchange Format is used to define a semantic category list schema and file. However, other languages and formats known to those skilled in the art may also be used in other embodiments of the invention.

It should also be understood that the present invention may be used to define actions that work in conjunction with a recognizer plug-in developed using another method. For example, an XML list may be used to define simple actions that work in conjunction with a recognizer plug-in developed using another method. The converse is also true: an XML list may be used to define a list of terms to recognize and actions may be defined using a more complicated tool such as Visual Basic.

Although the present invention has been described above as implemented in preferred embodiments, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. In a computer system for recognizing a semantic category in an electronic document, a semantic category list file stored in a directory associated with the computer system, the file comprising:

a semantic category list tool for creating the semantic category list file that includes elements of a semantic category list schema, wherein the semantic category is utilized to present a user with choices of actions that are executed in reference to a text and a type label of a string in the electronic document labeled with the type label as belonging to the semantic category, wherein the semantic category list schema is an XML schema and wherein the XML schema includes a binary representation of the elements;

a list of terms in the semantic category list file, wherein the terms are strings in the electronic document that are recognized as belonging to the semantic category, wherein the strings in the electronic document are labeled with a type label associating each string with a semantic category, and wherein an updated list of terms for the semantic category list file is stored in a semantic category term file; and a list of a plurality of actions in the semantic category list file, wherein the plurality of actions are actions performed in reference to each term in the list of terms in the semantic category list file, wherein the list of terms and the list of a plurality of actions in the semantic category list file are defined according to an Extensible Markup Language (XML) schema, wherein the XML schema is utilized to define a recognizer for recognizing the strings belonging to the semantic category, wherein the list of the plurality of actions is utilized to present a user with choices of actions that are executed in reference to each term, based on the type label associated with a text of each string, wherein an update Universal Resource Locator (URL) of a web server is called to locate a semantic category update file, wherein a lastcheckpoint value of the semantic category list file is sent to the web server, prior to the updated list of terms for the semantic category list file is stored in a semantic category term file, determine whether a new update exists wherein a checkpoint value of the semantic category update file is greater than the lastcheckpoint value of the semantic category list file, and, if so, then download a plurality of semantic category terms from the semantic category update file to replace a plurality of semantic category terms in the semantic category list file, if no update exists, leave the semantic category list file unchanged, and store the updated semantic category list file in the directory.

2. The semantic category file of claim 1 wherein the semantic category term file is a compressed binary file.

3. The semantic category file of claim 1 wherein the semantic category file further comprises a localeID identifying a language in which the terms are to-be recognized.

4. The semantic category file of claim 3, wherein the lastcheckpoint value identifies a version number of the last update of the semantic category file.

5. The semantic category file of claim 3 further comprising a lastupdate value, wherein the last update value identifies a time of the last update of the semantic category file.

6. The semantic category file of claim 5 wherein the update URL is a website address to check for updates to the list of terms.

7. The semantic category file of claim 6 further comprising an update frequency value, wherein the update frequency value specifies how often the list of terms are updated.

8. The semantic category file of claim 1 further comprising an action identifier uniquely identifying the action that applies to the semantic category.

9. The semantic category file of claim 8 further comprising an action URL specifying the URL to activate for the action.

10. A computer-implemented method for creating a semantic category list file for recognizing a semantic category in an electronic document, the method comprising:
   using a semantic category list tool for creating the semantic category list file that includes elements of a semantic category list schema, wherein the semantic category is utilized to present a user with choices of actions that are executed in reference to a text and a type label of a string in the electronic document labeled with the type label as belonging to the semantic category, wherein the semantic category list schema is an XML schema and wherein the XML schema includes a binary representation of the elements;
   calling an update Universal Resource Locator (URL) of a web server to locate a semantic category update file;
   sending a lastcheckpoint value of the semantic category list file to the web server;
   determining whether a new update exists prior to performing the update by determining whether a checkpoint value of the semantic category update file is greater than the lastcheckpoint value of the semantic category list file, and, if so, then downloading a plurality of semantic category terms from the semantic category update file to replace a plurality of semantic category terms in the semantic category list file;
   if no update is available, leaving the semantic category list file unchanged; and
   storing the semantic category list file in a directory.

11. The computer-implemented method of claim 10 wherein the semantic category list file comprises the following elements:
   a list of terms, wherein the terms are strings that are recognized as the semantic category; and
   a plurality of actions, wherein the plurality of actions are actions that are performed in reference to the semantic category.

12. A computer-implemented method for performing an update to a semantic category list file, comprising:
   using a semantic category list tool determining whether to proceed with the update to the semantic category list file, wherein each semantic category in the semantic category list file is utilized to present a user with choices of actions that are executed based on a text and a type label of a string in an electronic document belonging to each semantic category, and wherein each referenced string in the electronic document is labeled with the type label associating the string with a semantic category;
   calling an update Universal Resource Locator (URL) of a web server to locate a semantic category update file;
   sending a lastcheckpoint value of the semantic category list file to the web server;
   determining whether a new update exists prior to performing the update by determining whether a checkpoint value of the semantic category update file is greater than the lastcheckpoint value of the semantic category list file, and, if so, then downloading a plurality of semantic category terms from the semantic category update file to replace a plurality of semantic category terms in the semantic category list file;
   if no update is available, leaving the semantic category list file unchanged; and
   storing the updated semantic category list file in a directory.

13. The method of claim 12 further comprising updating the lastcheckpoint value in the semantic category list file that is equal to the checkpoint value of the semantic category update file.

14. The method of claim 13 further comprising setting a lastupdate value of the semantic category list file to a current time setting.

15. The method of claim 12 wherein determining whether to proceed with an update comprises determining whether the user has initiated an action associated with a semantic category list file, and, if so, then determining to perform an update.

16. The method of claim 12 wherein determining whether to proceed with an update comprises determining whether an interval of time specified in the semantic category list file has elapsed, and, if so, then determining to perform an update.

17. The method of claim 16 wherein the interval of time comprises an update frequency element.

* * * * *